United States Patent
Mukai et al.

(10) Patent No.: US 9,054,900 B2
(45) Date of Patent: Jun. 9, 2015

(54) NETWORK CONNECTION DEVICE AND METHOD

(75) Inventors: Masaki Mukai, Hyogo (JP); Ryuichi Okamoto, Osaka (JP); Tomoyuki Shimomura, Osaka (JP); Masaichi Yano, Hyogo (JP); Masato Ukena, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 326 days.

(21) Appl. No.: 13/556,848

(22) Filed: Jul. 24, 2012

(65) Prior Publication Data

US 2013/0031258 A1 Jan. 31, 2013

(30) Foreign Application Priority Data

Jul. 27, 2011 (JP) .................................. 2011-163975
Jul. 20, 2012 (JP) .................................. 2012-161438

(51) Int. Cl.
| | |
|---|---|
| G06F 15/16 | (2006.01) |
| H04W 36/00 | (2009.01) |
| G06F 3/00 | (2006.01) |
| H04L 12/64 | (2006.01) |
| H04B 17/00 | (2006.01) |
| H04W 88/06 | (2009.01) |

(52) U.S. Cl.
CPC ........ *H04L 12/6418* (2013.01); *H04B 17/0012* (2013.01); *H04W 88/06* (2013.01)

(58) Field of Classification Search
CPC ............ G06F 11/2007; G06F 11/3495; G06F 11/3404; H04L 12/2697; H04L 43/50; H04L 43/0811; H04L 41/06; H04L 12/5692; H04L 69/18; H04L 63/08; H04L 63/10; H04L 67/125; H04L 67/303; H04L 63/20; H04L 63/162; H04W 48/12; H04W 12/06; H04W 88/06; H04B 17/0012
USPC ........................................................ 709/227
See application file for complete search history.

(56) References Cited

U.S. PATENT DOCUMENTS

| | | | | |
|---|---|---|---|---|
| 7,487,239 | B2* | 2/2009 | Childress et al. | 709/224 |
| 8,019,082 | B1* | 9/2011 | Wiedmann et al. | 380/270 |
| 2002/0059434 | A1* | 5/2002 | Karaoguz et al. | 709/228 |
| 2004/0133687 | A1* | 7/2004 | Yamaguchi et al. | 709/228 |
| 2008/0086760 | A1* | 4/2008 | Jiang et al. | 726/3 |
| 2010/0290424 | A1* | 11/2010 | Collingrige | 370/329 |
| 2012/0173918 | A1* | 7/2012 | Olson et al. | 714/3 |

FOREIGN PATENT DOCUMENTS

| | | |
|---|---|---|
| JP | 2008-520164 | 6/2008 |
| WO | WO 2006/055127 | 5/2006 |

* cited by examiner

*Primary Examiner* — Arvin Eskandarnia
*Assistant Examiner* — Margishi Desai
(74) *Attorney, Agent, or Firm* — Hamre, Schumann, Mueller & Larson, P.C.

(57) ABSTRACT

A network connection device includes: one or more network devices; a network switching control section configured to determine a second network as a candidate network to which connection is subsequently switched from a first network to which a network device is currently connecting; a network relation state determination section configured to determine whether or not the network device is used for forming a PAN; a disconnection-caused disadvantage determination section configured to determine whether or not a disadvantage to a user will be caused by switching connection to the second network, based on the result of the determination by the network relation state determination section; and a switching acceptability determination section configured to prohibit switching connection to the second network when the result of the determination is that a disadvantage to the user will be caused.

21 Claims, 31 Drawing Sheets

FIG. 3

| PROFILE NAME | AUTOMATIC CONNECTION ACCEPTABILITY FLAG | AUTOMATIC CONNECTION PRIORITY LEVEL | NETWORK TYPE | NETWORK DEVICE IDENTIFICATION INFORMATION | NETWORK IDENTIFICATION INFORMATION | AUTHENTICATION/ ENCRYPTION INFORMATION | AT-CONNECTION PROCESS |
|---|---|---|---|---|---|---|---|
| PROFILE A | USABLE | 1 | WLAN | FIRST NETWORK DEVICE | FIRST NETWORK | AUTHENTICATION METHOD:A ENCRYPTION METHOD:AA INFORMATION FOR AUTHENTICATION:AAA | ACTIVATE APPLICATION A |
| PROFILE B | USABLE | 2 | WWAN | SECOND NETWORK DEVICE | SECOND NETWORK | AUTHENTICATION METHOD:B ENCRYPTION METHOD:BB INFORMATION FOR AUTHENTICATION:BBB | CHANGE IP ADDRESS TO bbb.bbb.bbb.bbb |
| PROFILE C | USABLE | 3 | WIRED LAN | THIRD NETWORK DEVICE | THIRD NETWORK | — | — |
| PROFILE D | UNUSABLE | — | WiMAX | FIRST NETWORK DEVICE | FOURTH NETWORK | AUTHENTICATION METHOD:D ENCRYPTION METHOD:DD INFORMATION FOR AUTHENTICATION:DDD | ACTIVATE APPLICATION D |
| ... | ... | ... | ... | ... | ... | ... | ... |

301 302 303 304 305 306 307 308

300

F I G. 7
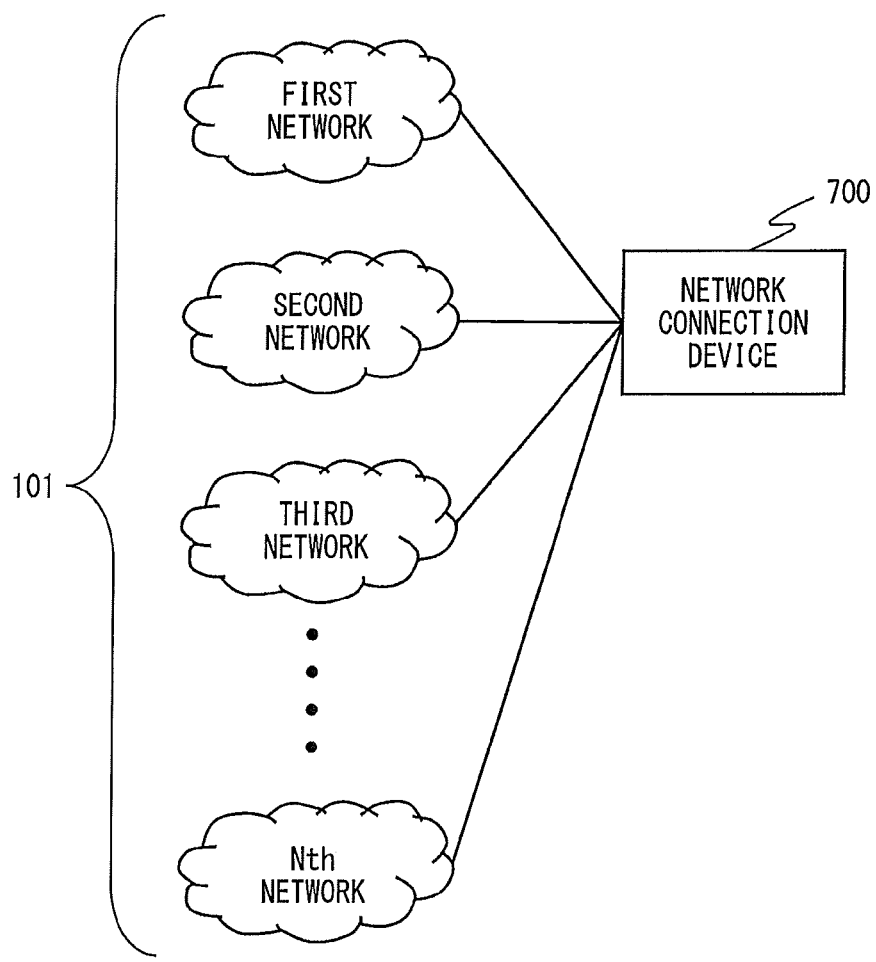

FIG. 12

| PROFILE NAME 1201 | NETWORK TYPE 1204 | NETWORK DEVICE IDENTIFICATION INFORMATION 1205 | NETWORK IDENTIFICATION INFORMATION 1206 | AUTHENTICATION/ ENCRYPTION INFORMATION 1207 | AT-CONNECTION AUTOMATICALLY-ACTIVATED APPLICATION 1209 |
|---|---|---|---|---|---|
| PROFILE A | WLAN | FIRST NETWORK DEVICE | FIRST NETWORK | AUTHENTICATION METHOD:A ENCRYPTION METHOD:AA INFORMATION FOR AUTHENTICATION:AAA | APPLICATION A |
| PROFILE B | WWAN | SECOND NETWORK DEVICE | SECOND NETWORK | AUTHENTICATION METHOD:B ENCRYPTION METHOD:BB INFORMATION FOR AUTHENTICATION:BBB | — |
| PROFILE C | WIRED LAN | THIRD NETWORK DEVICE | THIRD NETWORK | — | — |
| PROFILE D | WiMAX | FIRST NETWORK DEVICE | FOURTH NETWORK | AUTHENTICATION METHOD:D ENCRYPTION METHOD:DD INFORMATION FOR AUTHENTICATION:DDD | APPLICATION D |
| ... | ... | ... | ... | ... | ... |

1200

F I G. 1 4
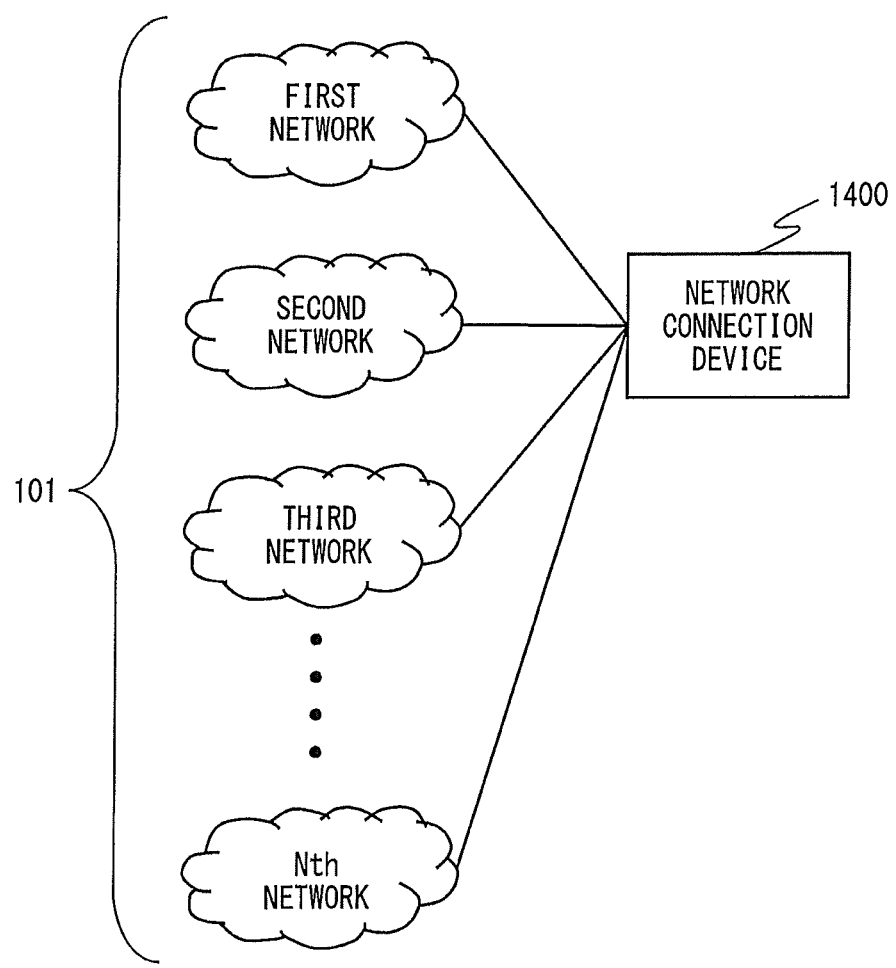

F I G. 1 6
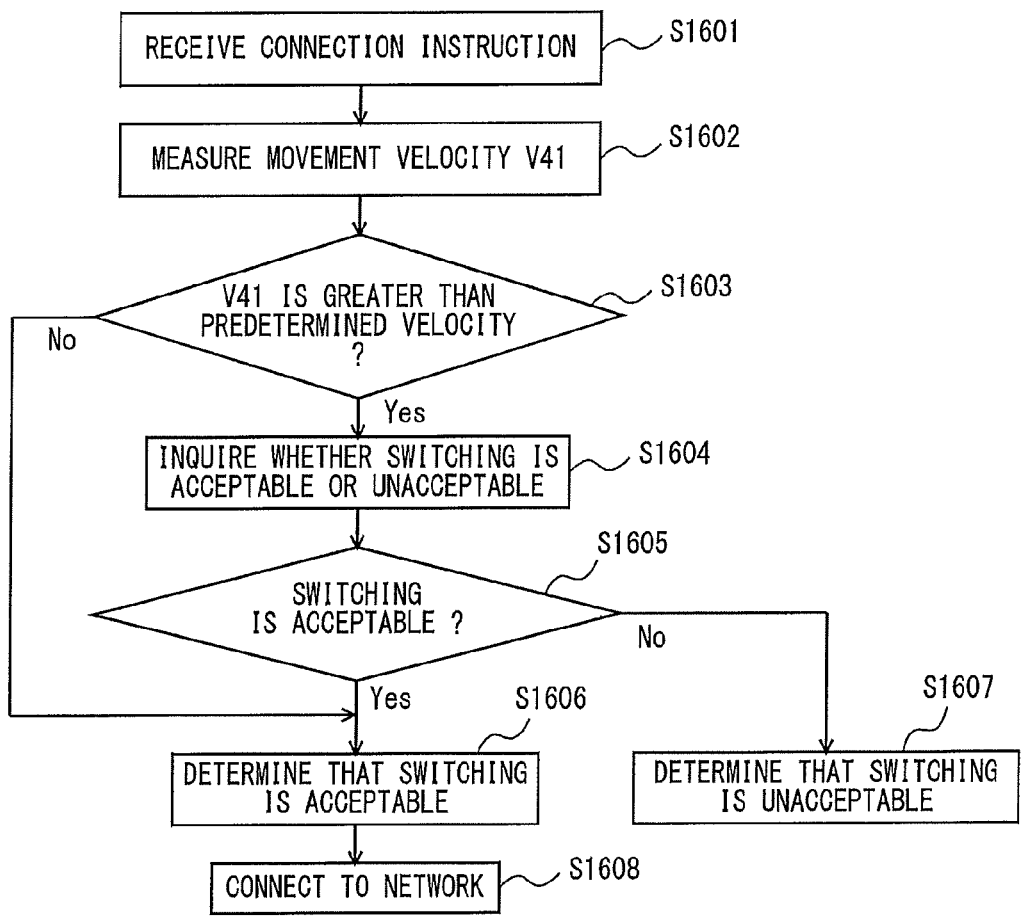

F I G. 1 7
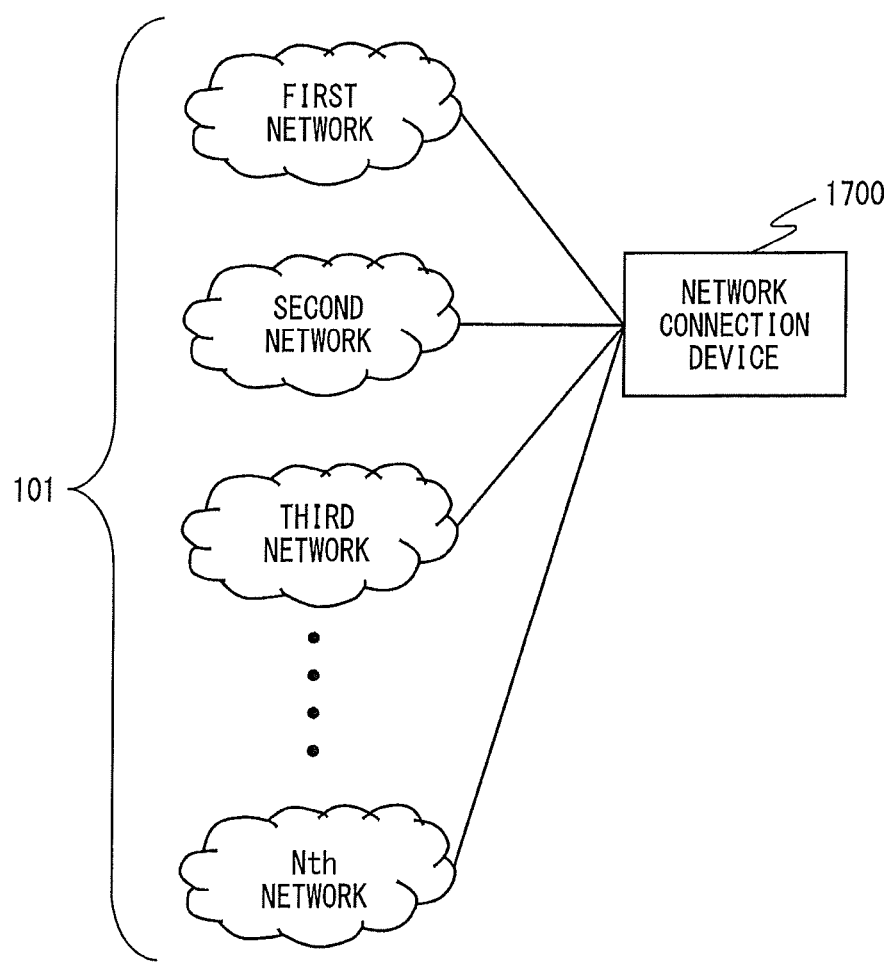

FIG. 19

| PROFILE NAME | AUTOMATIC CONNECTION PRIORITY LEVEL | NETWORK TYPE | NETWORK DEVICE IDENTIFICATION INFORMATION | NETWORK IDENTIFICATION INFORMATION | AUTHENTICATION/ENCRYPTION INFORMATION |
|---|---|---|---|---|---|
| PROFILE A | 1 | WLAN | FIRST NETWORK DEVICE | FIRST NETWORK | AUTHENTICATION METHOD:A ENCRYPTION METHOD:AA INFORMATION FOR AUTHENTICATION:AAA |
| PROFILE B | 1 | WLAN | FIRST NETWORK DEVICE | SECOND NETWORK | AUTHENTICATION METHOD:B ENCRYPTION METHOD:BB INFORMATION FOR AUTHENTICATION:BBB |
| PROFILE C | 1 | WLAN | FIRST NETWORK DEVICE | THIRD NETWORK | AUTHENTICATION METHOD:C ENCRYPTION METHOD:CC INFORMATION FOR AUTHENTICATION:CCC |
| PROFILE D | 2 | WWAN | SECOND NETWORK DEVICE | FOURTH NETWORK | AUTHENTICATION METHOD:D ENCRYPTION METHOD:DD INFORMATION FOR AUTHENTICATION:DDD |
| PROFILE E | 2 | WWAN | SECOND NETWORK DEVICE | FIFTH NETWORK | AUTHENTICATION METHOD:E ENCRYPTION METHOD:EE INFORMATION FOR AUTHENTICATION:EEE |
| ... | ... | ... | ... | ... | ... |

1901, 1903, 1904, 1905, 1906, 1907, 1900

F I G. 2 0

| PROFILE NAME | CUMULATIVE NUMBER OF TIMES OF CONNECTION |
|---|---|
| PROFILE A | 7 |
| PROFILE B | 15 |
| PROFILE C | 2 |
| PROFILE D | 6 |
| PROFILE E | 3 |
| ⋮ | ⋮ |

FIG. 21

| PROFILE NAME | AUTOMATIC CONNECTION ACTUAL PRIORITY LEVEL | NETWORK TYPE | NETWORK DEVICE IDENTIFICATION INFORMATION | NETWORK IDENTIFICATION INFORMATION | AUTHENTICATION/ENCRYPTION INFORMATION |
|---|---|---|---|---|---|
| PROFILE A | 2 | WLAN | FIRST NETWORK DEVICE | FIRST NETWORK | AUTHENTICATION METHOD:A ENCRYPTION METHOD:AA INFORMATION FOR AUTHENTICATION:AAA |
| PROFILE B | 1 | WLAN | FIRST NETWORK DEVICE | SECOND NETWORK | AUTHENTICATION METHOD:B ENCRYPTION METHOD:BB INFORMATION FOR AUTHENTICATION:BBB |
| PROFILE C | 3 | WLAN | FIRST NETWORK DEVICE | THIRD NETWORK | AUTHENTICATION METHOD:C ENCRYPTION METHOD:CC INFORMATION FOR AUTHENTICATION:CCC |
| PROFILE D | 4 | WWAN | SECOND NETWORK DEVICE | FOURTH NETWORK | AUTHENTICATION METHOD:D ENCRYPTION METHOD:DD INFORMATION FOR AUTHENTICATION:DDD |
| PROFILE E | 5 | WWAN | SECOND NETWORK DEVICE | FIFTH NETWORK | AUTHENTICATION METHOD:E ENCRYPTION METHOD:EE INFORMATION FOR AUTHENTICATION:EEE |
| ... | ... | ... | ... | ... | ... |

F I G. 2 4
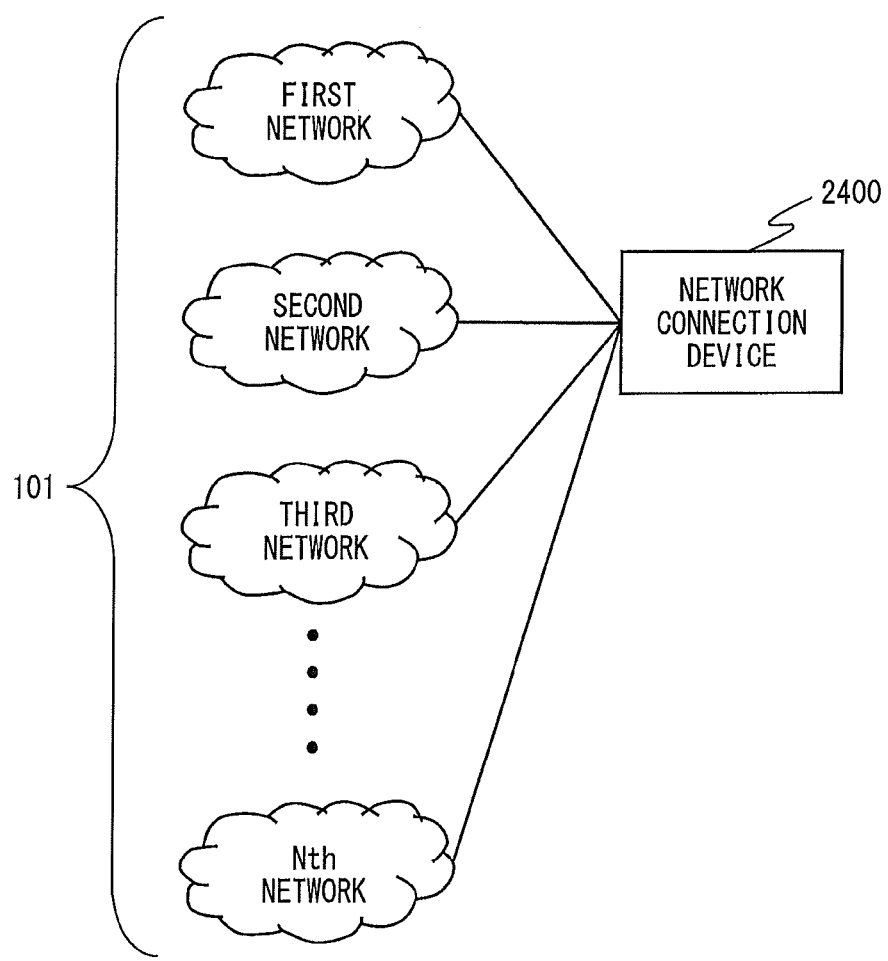

FIG. 26

| PROFILE NAME | AUTOMATIC CONNECTION PRIORITY LEVEL | NETWORK TYPE | NETWORK DEVICE IDENTIFICATION INFORMATION | NETWORK IDENTIFICATION INFORMATION | AUTHENTICATION/ENCRYPTION INFORMATION |
|---|---|---|---|---|---|
| 2601 | 2603 | 2604 | 2605 | 2606 | 2607 |
| PROFILE A | 1 | WLAN | FIRST NETWORK DEVICE | FIRST NETWORK | AUTHENTICATION METHOD:A ENCRYPTION METHOD:AA INFORMATION FOR AUTHENTICATION:AAA |
| PROFILE B | 2 | WLAN | FIRST NETWORK DEVICE | SECOND NETWORK | AUTHENTICATION METHOD:B ENCRYPTION METHOD:BB INFORMATION FOR AUTHENTICATION:BBB |
| PROFILE C | 3 | WLAN | FIRST NETWORK DEVICE | THIRD NETWORK | AUTHENTICATION METHOD:C ENCRYPTION METHOD:CC INFORMATION FOR AUTHENTICATION:CCC |
| PROFILE D | 4 | WWAN | SECOND NETWORK DEVICE | FOURTH NETWORK | AUTHENTICATION METHOD:D ENCRYPTION METHOD:DD INFORMATION FOR AUTHENTICATION:DDD |
| ... | ... | ... | ... | ... | ... |

2600

F I G. 2 7

| PROFILE NAME | AREA INFORMATION |
|---|---|
| PROFILE A | 34.743759 DEGREES NORTH LATITUDE<br>135.570431 DEGREES EAST LONGITUDE |
| PROFILE B | 35.681382 DEGREES NORTH LATITUDE<br>139.766084 DEGREES EAST LONGITUDE |
| PROFILE C | 34.686299 DEGREES NORTH LATITUDE<br>135.529146 DEGREES EAST LONGITUDE |
| PROFILE D | NONE |
| ⋮ | ⋮ |

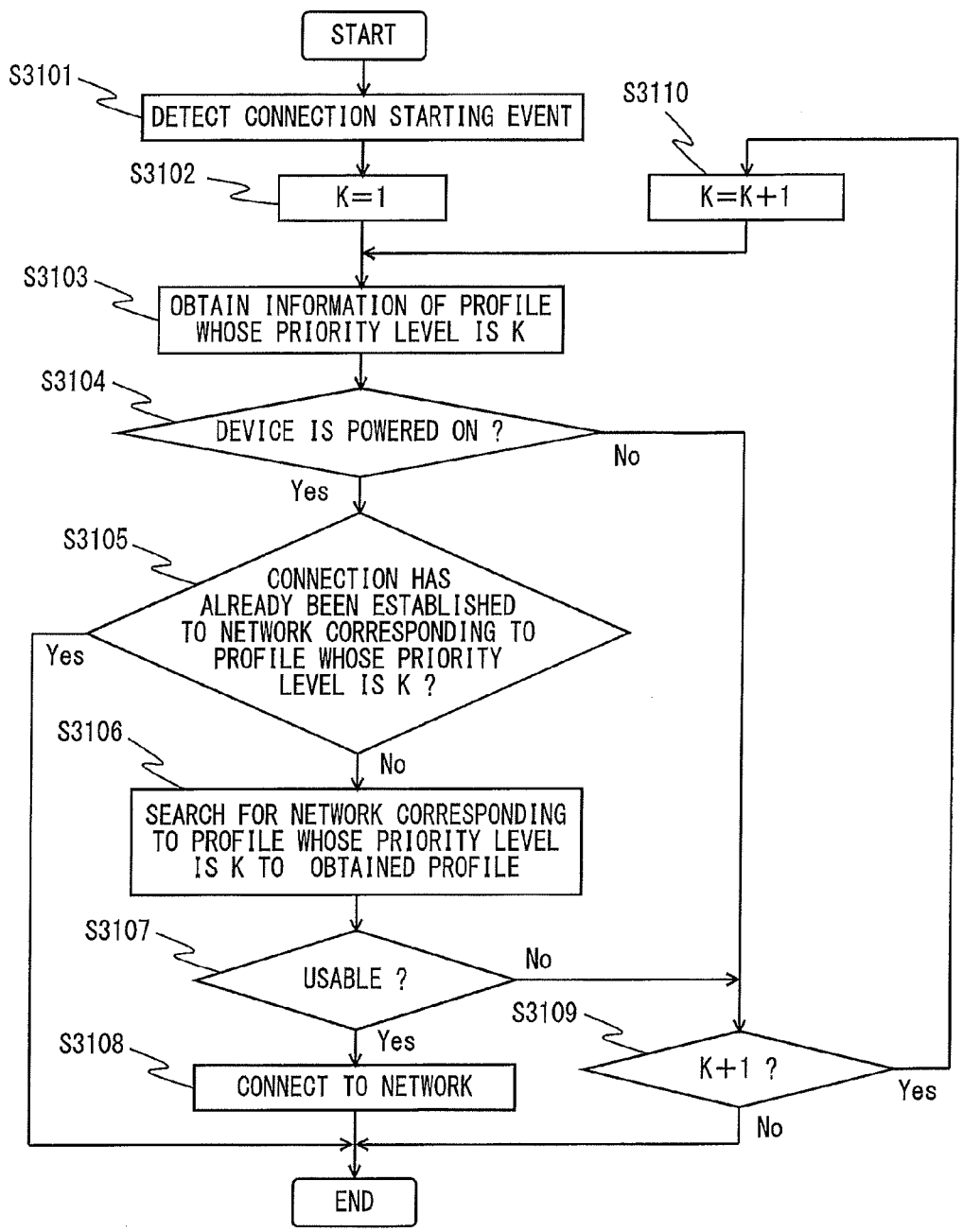

NETWORK CONNECTION DEVICE AND METHOD

BACKGROUND OF THE INVENTION

1. Field of the Invention

The present disclosure relates to a terminal device connectable to networks such as WWAN (Wireless Wide Area Network), WLAN (Wireless Local Area Network), and WiMAX (Worldwide Interoperability for Microwave Access).

2. Description of the Related Art

In recent years, various types of networks such as WWAN, WLAN, and WiMAX have become available owing to the advancement of network technology, and terminals connectable to these multiple types of networks are beginning to appear. Conventionally, in order to establish connection to these different types of networks, the connection needs to be made through the respective dedicated interfaces. In addition, when switching between the networks to which connection is established, a user needs to perform the switching manually through the corresponding interfaces.

Under such circumstances, methods have been conceived in which connection to these different networks can be established with a single interface, priority levels for connection to these networks can be set by a user, and connection to the networks is automatically made in accordance with the priority levels (Japanese Laid-Open Patent Publication (translation of PCT application) No. 2008-520164, for example).

SUMMARY OF THE INVENTION

The present disclosure provides a network connection device that controls network switching taking into account whether or not disadvantage to a user will be caused by switching between networks.

In order to solve the conventional problems described above, one aspect of the technology according to the present disclosure is a network connection device that switches a connection destination between a plurality of networks and connects to any one of the plurality of networks, the network connection device including: one or more network devices configured to connect to the plurality of networks which are connection destinations; a network switching control section configured to determine, in accordance with a predetermined condition, a second network as a candidate network to which connection is subsequently switched from a first network to which a network device is currently connecting; a network relation state determination section configured to determine whether or not the network device is used for forming a PAN (Personal Area Network); a disconnection-caused disadvantage determination section configured to determine whether or not a disadvantage to a user will be caused by switching connection to the second network, based on the result of the determination by the network relation state determination section; and a switching acceptability determination section configured to prohibit switching connection to the second network when the result of the determination by the disconnection-caused disadvantage determination section is that a disadvantage to the user will be caused.

According to the present disclosure, when connection to a network is attempted, network switching is restricted as necessary taking into account whether or not disadvantage to a user will be caused by switching between networks. Therefore, disadvantage to a user caused by network switching can be reduced.

BRIEF DESCRIPTION OF THE DRAWINGS

FIG. 3 is a diagram showing an example of a profile list 300 according to the first embodiment;

FIG. 7 is a diagram illustrating an environment in which a network connection device 700 according to a second embodiment operates;

FIG. 12 is a diagram showing an example of a profile list 1200 according to the third embodiment;

FIG. 14 is a diagram illustrating an environment in which a network connection device 1400 according to a fourth embodiment operates;

FIG. 16 is a flowchart showing the operation of the network connection device 1400 according to the fourth embodiment;

FIG. 17 is a diagram illustrating an environment in which a network connection device 1700 according to a fifth embodiment operates;

FIG. 19 is a diagram showing an example of a profile list 1900 according to the fifth embodiment;

FIG. 20 is a diagram showing an example of connection frequency information 2000 according to the fifth embodiment;

FIG. 21 is a diagram showing an example of an at-network-switching profile list 2100 according to the fifth embodiment;

FIG. 24 is a diagram illustrating an environment in which a network connection device 2400 according to a sixth embodiment operates;

FIG. 26 is a diagram showing an example of a profile list 2600 according to the sixth embodiment and a seventh embodiment;

FIG. 27 is a diagram showing an example of network area information 2700 according to the sixth embodiment;

FIG. 31 is a flowchart showing the operation of the network connection device 2400 according to the seventh embodiment.

DESCRIPTION OF PREFERRED EMBODIMENTS

In the case of conventional terminals connectable to multiple types of networks, if switching between the networks is automatically performed merely in accordance with priority levels set by a user, a problem may arise that an operation having been executed by the user using a network before the switching needs to be executed again with another network after the switching. For example, one possible problem is that data transfer such as file download and video streaming having been continued by using a network before the switching is interrupted, and thus the data transfer has to be executed again with another network after the switching. Another possible problem is that in the case where a user operation system requiring logon has been used on a network before the switching, unanticipated logoff occurs, causing necessity of performing logon again by inputting a user ID and a password on another network after the switching.

Furthermore, conventional arts have a problem that, in the case where a network device having been used before network switching becomes unusable at the time of network switching, if not only connection to a first network but also connection to a second network have been established by the network device before the switching, the connection to the second network is also terminated.

Hereinafter, embodiments of a network connection device that can solve these problems will be described in detail with reference to the drawings. It should be noted that unnecessarily-detailed descriptions are omitted in some cases. For example, detailed descriptions of well-known matters and repetitive descriptions of substantially the same components are omitted in some cases. This is in order to avoid unnecessary redundancy of the following descriptions and facilitate understanding by persons in the art. It should be noted that the inventors provide the accompanying drawings and the following descriptions in order for persons in the art to sufficiently understand the present disclosure, and do not intend to limit the subject matter recited in the claims by the drawings and descriptions.

First Embodiment

Figure 1:
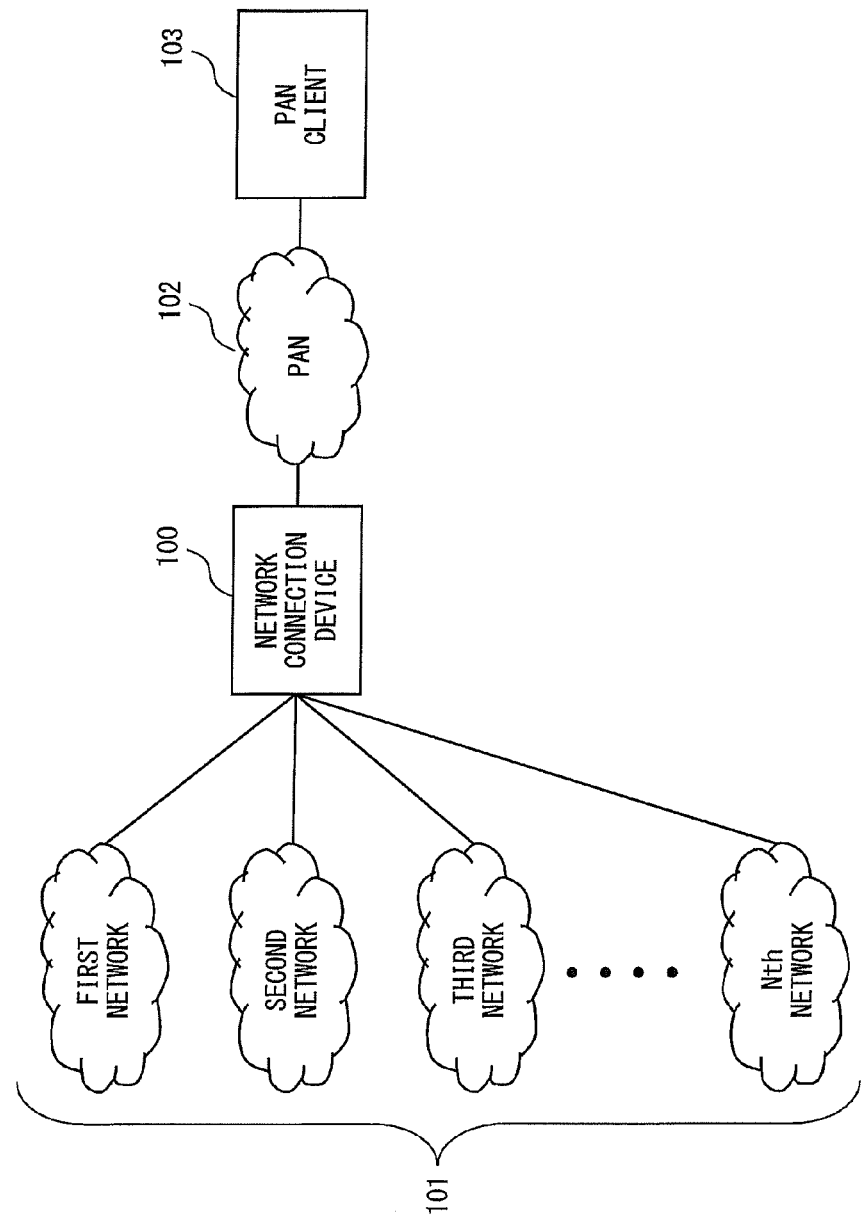
FIG. 1 is a diagram illustrating an environment in which a network connection device 100 according to a first embodiment operates.

FIG. 1 is a diagram illustrating an environment in which a network connection device 100 according to a first embodiment operates.

In FIG. 1, the environment in which the network connection device 100 operates includes one or more networks 101, a PAN (Personal Area Network) 102, and a PAN client 103. Hereinafter, each of the components will be described.

The networks 101 are networks to which the network connection device 100 can connect. For example, the networks 101 are WWAN (Wireless Wide Area Network), WLAN (Wireless Local Area Network/Wireless LAN), WiMAX (Worldwide Interoperability for Microwave Access) Network, Wired LAN (Local Area Network), or the like.

The PAN 102 is a PAN formed by the network connection device 100 acting as a host. The PAN 102 connects the network connection device 100 and another terminal such that they can communicate with each other. A conceivable example of the PAN 102 is a local network or the like which is formed when the network connection device 100 functions as an access point for WLAN and another terminal connects to the access point. Examples of the other terminal include a personal computer, a wireless television, a mouse, a keyboard, a smartphone, and the like.

The PAN client 103 is a terminal to be connected to the PAN 102, and communicates with the network connection device 100 via the PAN 102.

Figure 2:
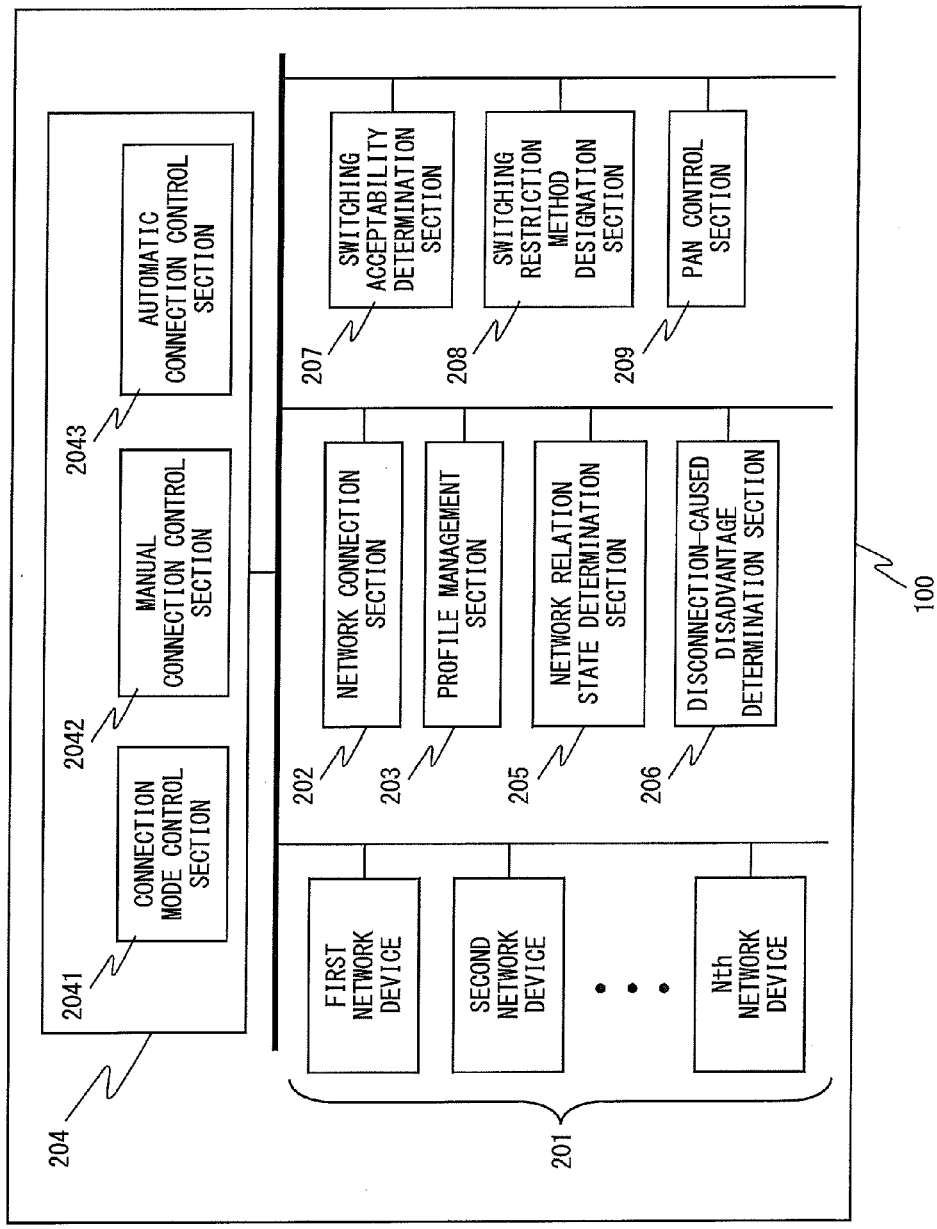
FIG. 2 is a block diagram showing a configuration of the network connection device 100 according to the first embodiment.

Next, the overall configuration of the network connection device 100 will be described with reference to FIG. 2. In FIG. 2, the network connection device 100 includes one or more network devices 201, a network connection section 202, a profile management section 203, a network switching control section 204, a network relation state determination section 205, a disconnection-caused disadvantage determination section 206, a switching acceptability determination section 207, a switching restriction method designation section 208, and a PAN control section 209. In addition, the network switching control section 204 includes a connection mode control section 2041, a manual connection control section 2042, and an automatic connection control section 2043. Hereinafter, each of the components will be described.

Each of the network devices 201 is a device that connects to a corresponding one of the networks 101 which are connection destinations, and is also a device for forming the PAN 102. Examples of the network devices 201 include WWAN devices which connect to WWAN, WLAN devices which connect to WLAN, WiMAX devices which connect to WiMAX, Wired LAN devices which connect to Wired LAN, and WLAN/WiMAX combo devices which connect to WLAN or WiMAX.

The network connection section 202 controls the network devices 201. The network connection section 202 obtains information about the state of connection/disconnection to/from the networks 101 and information about whether the networks 101 are usable or not. For example, the network connection section 202 allows only one network device 201 to connect to a network 101. When connection is switched to another network of the networks 101, if another network device 201 needs to be used, the network connection established by the one network device 201 used before the switching is terminated. A single network connection section 202 may be used as shown in FIG. 2 or, for example, a plurality of network connection sections 202 respectively corresponding to the network devices 201 may be used.

The profile management section 203 manages profiles that contain various information needed when connection to the networks 101 is made and other additional information. In addition, the profile management section 203 manages a profile list 300 described later with reference to FIG. 3. The various information of the profiles are set by a user.

The network switching control section 204 determines a candidate network (e.g., a second network) to which connection is subsequently switched from a network (e.g., first network) to which a network device 201 is currently connecting, in accordance with predetermined conditions. Specifically, one profile that contains information needed for connection to the candidate network to which connection is next made is selected from among the profiles managed by the profile management section 203. The candidate network to which connection is next made is determined by the connection mode control section 2041, the manual connection control section 2042, and the automatic connection control section 2043 which will be described later. The network switching control section 204 performs process of connection/disconnection to/from the networks 101 in accordance with the selected profile.

The connection mode control section 2041 controls switching of connection mode of the network connection device 100. The connection mode control section 2041 switches the connection mode in accordance with an instruction from the user or the state of the network connection device 100. Here, the connection mode of the network connection device 100 includes two modes, a manual connection mode and an automatic connection mode. The manual connection mode is a mode for performing connection/disconnection to/from the networks 101 based on an instruction from the user. The automatic connection mode is a mode for automatically performing connection/disconnection to/from the networks 101 without an instruction from the user based on predetermined rules described later. When the network connection device 100 is started up, any of the manual connection mode and the automatic connection mode may be selected as an initial setting.

When the connection mode of the network connection device 100 is the manual connection mode, the manual connection control section 2042 performs control in accordance with an instruction from the user so that connection/disconnection to/from the networks 101 is performed.

When the connection mode of the network connection device 100 is the automatic connection mode, the automatic connection control section 2043 performs control in accordance with the predetermined rules described later so that connection/disconnection to/from the networks 101 is performed When connection to a network is currently established, the network relation state determination section 205 determines whether or not a network device used for the connection is used for forming a PAN different than the network.

Based on the profile selected by the network switching control section 204 and the result of determination by the network relation state determination section 205, the disconnection-caused disadvantage determination section 206 determines whether or not a disadvantage to the user will be caused by disconnection from a network to which connection is currently established and by connection to another network determined by the network switching control section 204 as the candidate network to which connection is next made.

The switching acceptability determination section 207 determines the acceptability of network switching in accordance with a method for restricting network switching designated by the switching restriction method designation section 208 described below. In the present embodiment, the switching restriction method designation section 208 designates "prohibition of network switching" as will be described below. Thus, when network switching is "unacceptable", the switching acceptability determination section 207 prohibits the network switching.

When the network switching control section 204 has determined a candidate network to which connection is switched, the switching restriction method designation section 208 designates "prohibition of network switching" as a switching restriction method used in the case where the disconnection-caused disadvantage determination section 206 determines that a disadvantage to the user will be caused by disconnection from a network to which connection is currently established and by connection to another network determined by the network switching control section 204 as the candidate network to which connection is next made.

The PAN control section 209 controls the network devices 201 to form and discard the PAN 102, in accordance with an instruction from the user. When forming the PAN 102, the PAN control section 209 makes setting of various information, such as setting of an authentication method and an encryption method used for connection to the PAN 102. In addition, the PAN control section 209 manages information such as the state of connection of the PAN client 103 to the PAN 102 and the type of the connected PAN client 103.

Next, the profile list 300 managed by the profile management section 203 will be described. FIG. 3 is a diagram showing an example of the profile list 300. In FIG. 3, profiles listed in the profile list 300 each include a profile name 301, an automatic connection acceptability flag 302, an automatic connection priority level 303, a network type 304, network device identification information 305, network identification information 306, authentication/encryption information 307, and an at-connection process 308. Hereinafter, each of the components will be described. The profile name 301 indicates the name of a profile.

The automatic connection acceptability flag 302 is information indicating whether or not a profile is allowed to be used for network connection in the automatic connection mode. For connection, the automatic connection control section 2043 of the present embodiment uses only profiles for which "usable" is set in the automatic connection acceptability flag 302. By setting a value "unusable" in the automatic connection acceptability flag 302, the user can eliminate, from the choices, a profile which the user does not want to use in the automatic connection mode or in the use of which the user wants to exercise caution. For example, one conceivable method is to set "unusable" for a profile that is used for connection to a network 101, such as in-company network and fee-incurring network, the connection to which should be recognized by the user.

The automatic connection priority level 303 is information indicating the priority level of a profile for use in network connection in the automatic connection mode. The automatic connection control section 2043 uses the profiles in descending order of the priority levels at the time of network connection. In the example of FIG. 3, the automatic connection priority levels 303 is set as an integer value starting from "1", and "1" corresponds to the highest priority level. The greater the integer value is, the lower the priority level is.

The network type 304 is information indicating the type of a network 101 to which connection is made by using a profile. The network device identification information 305 is information for specifying a network device 201 to be used when network connection is made by using the profile. The network identification information 306 is information for specifying the network 101 to which connection is made by using the profile. The authentication/encryption information 307 is information about authentication and encryption needed when connection to the network 101 is made by using the profile. The at-connection process 308 is information indicating a process executed when connection to the network 101 has been established by using the profile.

In FIG. 3, the profile list 300 lists four profiles whose profile names 301 are "profile A", "profile B", "profile C", and "profile D", respectively. The profiles allowed to be used in the automatic connection mode are "profile A", "profile B", and "profile C". The priority levels of "profile A", "profile B", and "profile C" for use in the automatic connection mode are 1, 2, and 3, respectively. The profile list 300 indicates, for example, that the type of a network 101 to which connection is made by using "profile A" is "WLAN", a network device 201 used when network connection is made by using "profile A" is a "first network device", the network 101 to which connection is made by using "profile A" is a "first network", an authentication method used when connection to the network 101 is made by using "profile A" is "A", an encryption method is "AA", information for authentication such as a network key is "AAA", and a process executed when connection to the network 101 has been established by using "profile A" is "activation of application A".

Next, the operation of the network connection device 100 according to the present embodiment will be described with reference to a flowchart.

First, the steps of a manual connection process for connection to a network 101 performed by the network connection device 100 in the manual connection mode will be described with reference to the flowchart shown in FIG. 4.

S401: The manual connection control section 2042 receives an instruction for connection to a network 101 inputted by a user via input means such as a keyboard which is not shown. The instruction for connection contains a profile name 301 (defined as a profile name PN1) of a profile selected by the user for use in network connection.

S402: The manual connection control section 2042 refers to the profile list 300 managed by the profile management section 203, and obtains information of the profile (defined as a profile P1) having the profile name PN1.

S403: The manual connection control section 2042 transfers the information of the profile P1 to the network connection section 202, and requests the network connection section 202 to search for a network 101 to which connection is made by using the profile P1. The network connection section 202 searches for the network 101 (defined as a network NW1) specified based on the network identification information 306, by using a network device 201 (defined as a network device ND1) specified based on the network device identification information 305 contained in the received profile P1, and then determines whether or not the network NW1 is usable. Whether or not the network NW1 is usable is determined by, for example, whether or not the network connection device 100 is within an area in which connection to the network NW1 can be made and whether or not contract for connection is valid.

S404: When the determination result is "unusable", the network connection section 202 notifies the manual connection control section 2042 of the determination result and the reason therefor. When the determination result is "usable", the manual connection control section 2042 transfers the profile name PN1 to the switching acceptability determination section 207, and instructs the switching acceptability determination section 207 to perform a switching acceptability determination process (S405) for the profile name PN1. When the determination result is "unusable", the manual connection control section 2042 notifies the user of the fact that the network 101 for which the user issues an instruction for connection is unusable and the reason therefor via output means such as a display which is not shown, and then ends the process.

Figure 6:
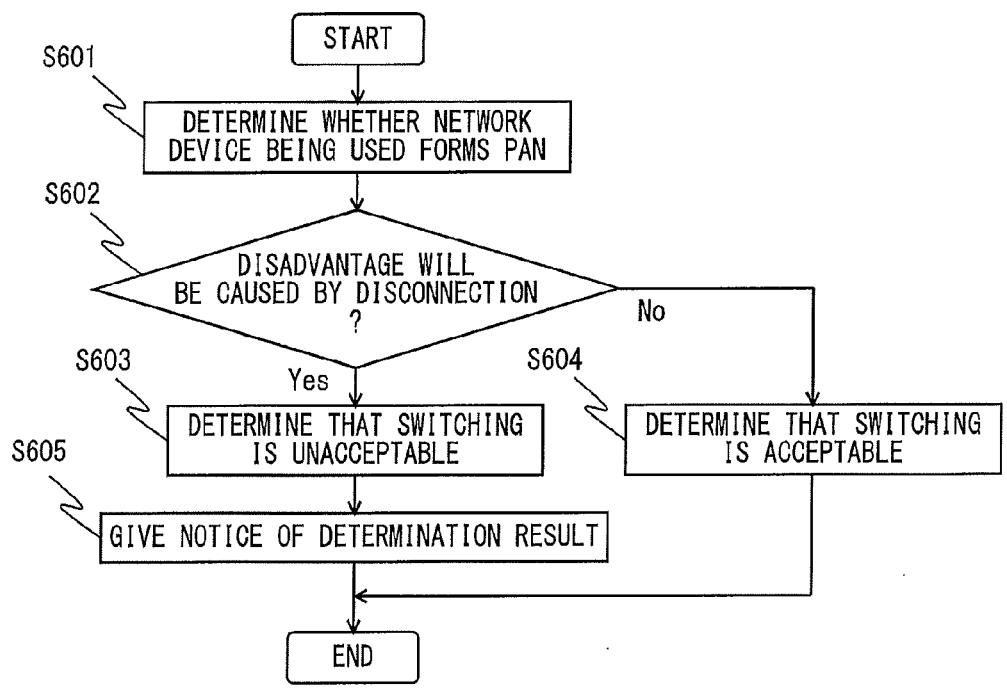
FIG. 6 is a flowchart showing the steps of a switching acceptability determination process according to the first embodiment.

S405: The switching acceptability determination process described later with reference to FIG. 6 is executed.

S406: When the determination result of the switching acceptability determination process at step S405 is that "switching is unacceptable", the manual connection control section 2042 receives the determination result and the reason therefor. When it is determined that "switching is acceptable" as a result of the switching acceptability determination process at step S405, the manual connection control section 2042 transfers the information of the profile P1 to the network connection section 202, and instructs the network connection section 202 to connect to the network NW1. When it is determined that "switching is unacceptable" as a result of the switching acceptability determination process at step S405, the manual connection control section 2042 notifies the user of the fact that the network NW1 is unusable and the reason therefor via output means such as a display which is not shown, and then ends the process.

S407: The network connection section 202 connects to the network NW1 by using the network device ND1. The network connection section 202 uses the contents described in the authentication/encryption information 307 contained in the profile P1 as authentication/encryption-related information needed for connection to the network NW1. When the cell of the authentication/encryption information 307 is blank or when additional information is needed, an inquiry is made to the user to obtain information. In addition, in the case where connection to a network 101 other than the network NW1 has already been established, the network connection section 202 disconnects from the other network 101. Furthermore, the manual connection control section 2042 refers to the at-connection process 308 of the profile P1, and executes the described process.

Next, the steps of an automatic connection process for connection to a network 101 performed by the network connection device 100 in the automatic connection mode will be described with reference to the flowchart shown in FIG. 5.

S501: The automatic connection control section 2043 detects an event acting as a trigger for staring a process for connection to a network 101 from step S502. The event is generated at a predetermined time. For example, the event may be regularly generated every predetermined period based on a timer which is not shown, or may be generated at a time when the network connection device 100 has made transition to a predetermined state, such as when the network connection device 100 has been activated or recovered from a quiescent state and when the state of connection to the networks 101 has been changed.

S502: The automatic connection control section 2043 sets K to 1 (K is an integer to be incremented within a range of 1≤K≤N, and N is the number of profiles) in order to perform step S503 and the subsequent steps for a profile of which the automatic connection priority level 303 in the profile list 300 is "1", and then proceeds to step S503.

S503: The automatic connection control section 2043 refers to the profile list 300 managed by the profile management section 203, and obtains information of a profile (defined as a profile P1-K) of which the automatic connection priority level 303 is "K".

S504: The automatic connection control section 2043 transfers the information of the profile P1-K to the network connection section 202, and inquires of the network connection section 202 whether or not connection has already been established to a network 101 (defined as a network NW1-K) to which connection is made by using the profile P1-K. The network connection section 202 determines whether or not connection to the network NW1-K has already been established, by using a network device 201 (defined as a network device ND1-K) specified based on the network device identification information 305 contained in the received profile. The network connection section 202 notifies the automatic connection control section 2043 of the determination result.

When the determination result is "already connected", the automatic connection control section 2043 determines that connection to the network 101 has already been established in according with the priority levels, and then ends the process without any change. When the determination result is "unconnected", the automatic connection control section 2043 proceeds to step S505.

S505: The automatic connection control section 2043 transfers the information of the profile P1-K to the network connection section 202, and requests the network connection section 202 to search for the network 101 to which connection is made by using the profile P1-K. The network connection section 202 searches for the network NW1-K by using the network device ND1-K, and determines whether or not the network NW1-K is usable.

S506: When the determination result is "unusable", the network connection section 202 notifies the automatic connection control section 2043 of the determination result and the reason therefor. When the determination result received from the network connection section 202 is "usable", the automatic connection control section 2043 transfers the profile name 301 of the profile P1-K to the switching acceptability determination section 207, and instructs the switching acceptability determination section 207 to perform a switching acceptability determination process (S507) for the profile p1-K. When the determination result received from the network connection section 202 is "unusable", the automatic connection control section 2043 proceeds to step S510.

S507: The switching acceptability determination process described later with reference to FIG. 6 is executed.

S508: When the determination result of the switching acceptability determination process at step S507 is that "switching is unacceptable", the automatic connection control section 2043 receives the determination result and the reason therefor. When it is determined that "switching is acceptable" as a result of the switching acceptability determination process at step S507, the automatic connection control section 2043 transfers the information of the profile P1-K to the network connection section 202, and instructs the network connection section 202 to connect to the network NW1-K. When it is determined that "switching is unacceptable" as a result of the switching acceptability determination process at step S507, the automatic connection control section 2043 proceeds to step S510.

S509: The network connection section 202 connects to the network NW1-K by using the network device ND1-K, and then ends the process. The network connection section 202 uses the contents described in the authentication/encryption information 307 contained in the profile P1-K as authentication/encryption-related information needed for connection. When the cell of the authentication/encryption information 307 is blank or when additional information is needed, an inquiry is made to the user to obtain information. In addition, in the case where connection to a network 101 other than the network NW1-K has already been established, the network connection section 202 disconnects from the other network 101. Furthermore, the automatic connection control section 2043 refers to the at-connection process 308 of the profile P1-K, and executes the described process.

S510: The automatic connection control section 2043 refers to the profile list 300 managed by the profile management section 203, and confirms the presence or absence of a profile of which the automatic connection priority level 303 is "K+1". When the profile of which the automatic connection priority level 303 is "K+1" is proved to be absent as a result of the confirmation, the process ends without any change. When the profile of which the automatic connection priority level 303 is "K+1" is present, the process proceeds to step S511.

S511: The automatic connection control section 2043 sets K to K+1, and proceeds to step S503.

Next, the steps of the switching acceptability determination process (S405 in FIG. 4 and S507 in FIG. 5) will be described with reference to the flowchart shown in FIG. 6.

S601: The network relation state determination section 205 determines whether or not a network device (defined as a network device ND11) currently connected to a network is used for forming a PAN (defined as a PAN_PN11), by, for example, inquiring of the PAN control section 209, and then the process proceeds to step S602.

S602: The disconnection-caused disadvantage determination section 206 determines whether or not disconnection of the network device D11 from the network will cause a disadvantage to the user, based on the determination result obtained at step S601. Specifically, if the network device D11 is used for forming the PAN_PN11, the disconnection-caused disadvantage determination section 206 determines that disconnection of the network device D11 from the network will lead to extinction of the PAN_PN11 and thereby cause a disadvantage to the user, and then the process proceeds to step S603. Otherwise, the disconnection-caused disadvantage determination section 206 determines that disconnection of the network device D11 from the network will cause no disadvantage to the user, and then the process proceeds to step S604.

S603: The switching acceptability determination section 207 determines that network switching is unacceptable in accordance with "prohibition of network switching" designated by the switching restriction method designation section 208, and then the process proceeds to step S605.

S604: The switching acceptability determination section 207 determines that network switching is acceptable, and then the process proceeds to step S605.

S605: When the determination result is that "switching is unacceptable", the switching acceptability determination section 207 notifies the manual connection control section 2042 or the automatic connection control section 2043 of the determination result and the reason therefor, and then the process ends.

As described above, according to the present embodiment, when a network device currently used for connection is also used for forming a PAN, the disconnection-caused disadvantage determination section 206 determines that disconnection from a network to which connection is currently established will lead to termination of connection via the PAN that should not occur. Therefore, it becomes possible to prevent unexpected disadvantage to the user from being caused by disconnection from a network.

The extinction of a PAN in the above has been described as occurring when network connection by a network device that is also used for forming the PAN is terminated. However, the present disclosure is not limited thereto. The extinction of a PAN occurs also when a communication standard for communication performed by a network device has changed. In the case where a PAN is formed in accordance with a specific communication standard, connection to a network (first network) is currently established via the specific communication standard, and the connection is to be switched to another network (second network) via a communication standard different from the specific communication standard, there is a possibility that the PAN will be extinguished by the switching to the second network. Extinction of a PAN due to such a cause often occurs in a combo device in which a network device exclusively controls a plurality of communication standards. An example in which the communication standard is switched from WLAN to WiMAX will be described. In the case where a network device forming a PAN is, for example, a WLAN/WiMAX combo device and the PAN is formed by WLAN, when connection to WiMAX network is made by using the network device, the PAN is automatically extinguished. In this modification example, when connection to WiMAX network is attempted while the PAN is formed, the disconnection-caused disadvantage determination section 206 determines in the switching acceptability determination process that the switching will lead to termination of the connection via the PAN which should not occur, and that the switching is unacceptable. As another modification example in which a PAN is disadvantageously extinguished, a case is conceivable where a network device 201 forming a PAN is the same as that to be connected to a network 101, and the communication frequency band and communication standard used for forming the PAN are changed in accordance with the communication frequency band and communication standard for the network 101 to which connection is made. For example, a case is conceivable where, when connection to a network 101 is made by using IEEE802.11a standard while a PAN is formed by using IEEE802.11g standard, the communication standard for forming the PAN is switched to 802.11a standard. In this modification example, when connection to a network 101 using 802.11a standard is attempted while a PAN is formed by 802.11g standard, the disconnection-caused disadvantage determination section 206 determines in the switching acceptability determination process that the switching will lead to termination of the connection via the PAN which should not occur, and that the switching is unacceptable. The disconnection-caused disadvantage determination section 206 determines that switching is unacceptable, with respect to operations leading to termination of connection via a PAN which should not occur, including those shown in the modification examples.

The disconnection-caused disadvantage determination section 206 may determine, based on the communication contents of the PAN client 103, that switching is unacceptable with respect to operations leading to termination of connection via a PAN. Specifically, only when it has been determined that the PAN client 103 is transmitting or receiving continuous data units, the disconnection-caused disadvantage determination section 206 may determine that switching is unacceptable with respect to operations leading to termination of connection via a PAN. For example, only when it has been determined that the PAN client 103 is downloading or uploading a data file via a PAN, the disconnection-caused disadvantage determination section 206 may determine that switching is unacceptable with respect to operations leading to termination of connection via the PAN. Alternatively, only when it has been determined that the PAN client 103 is transmitting or receiving streaming data via a PAN, the disconnection-caused disadvantage determination section 206 may determine that switching is unacceptable with respect to operations leading to termination of connection via the PAN.

Although the above description has been given on the assumption that the automatic connection priority level 303 in FIG. 3 is set for each profile, the present disclosure is not limited thereto, and the automatic connection priority level 303 may be set for each network type 304. For example, the priority level "1" may be set for a profile whose network type 304 is "WLAN", and the priority level "2" may be set for a profile whose network type 304 is "WWAN".

Although the above description has been given on the assumption that the user makes setting of various information of the profiles, the present disclosure is not limited thereto, and the network connection device 100 may automatically make the setting. For example, the authentication method and the encryption method contained in the authentication/encryption information 307 may automatically be set by obtaining information from a network 101. Alternatively, information for setting may be distributed via a network 101 or the like from a profile management server or the like which is not shown, and then the various information of the profiles may be set.

Figure 4:
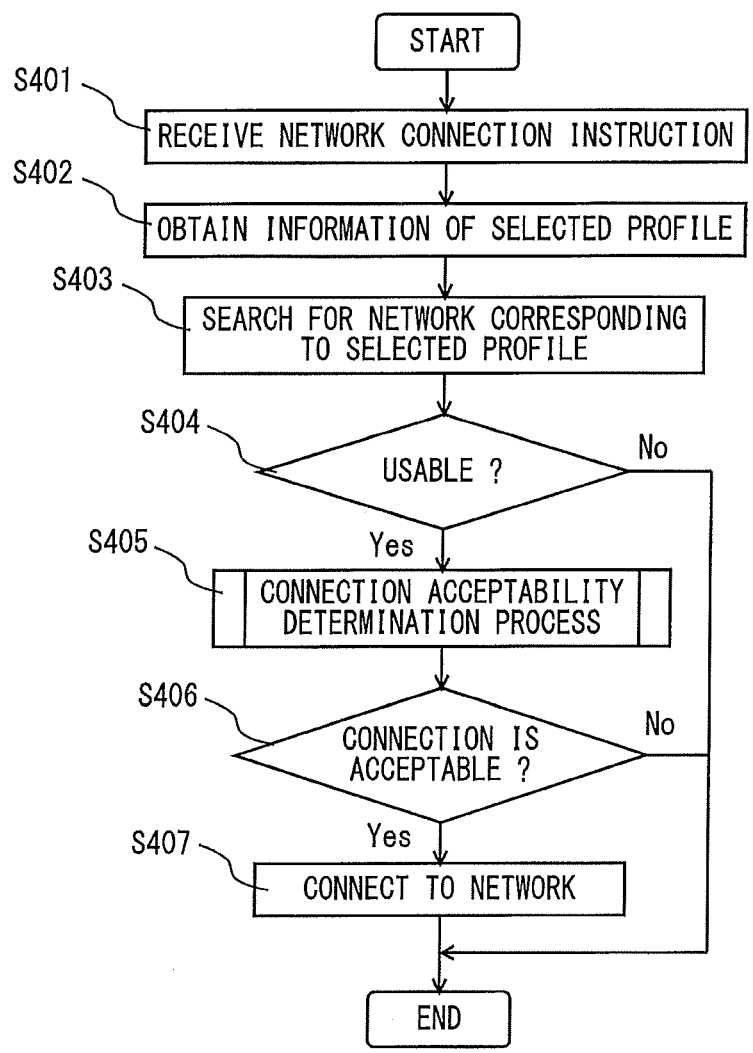
FIG. 4 is a flowchart showing the steps of a manual connection process according to the first embodiment.
Figure 5:
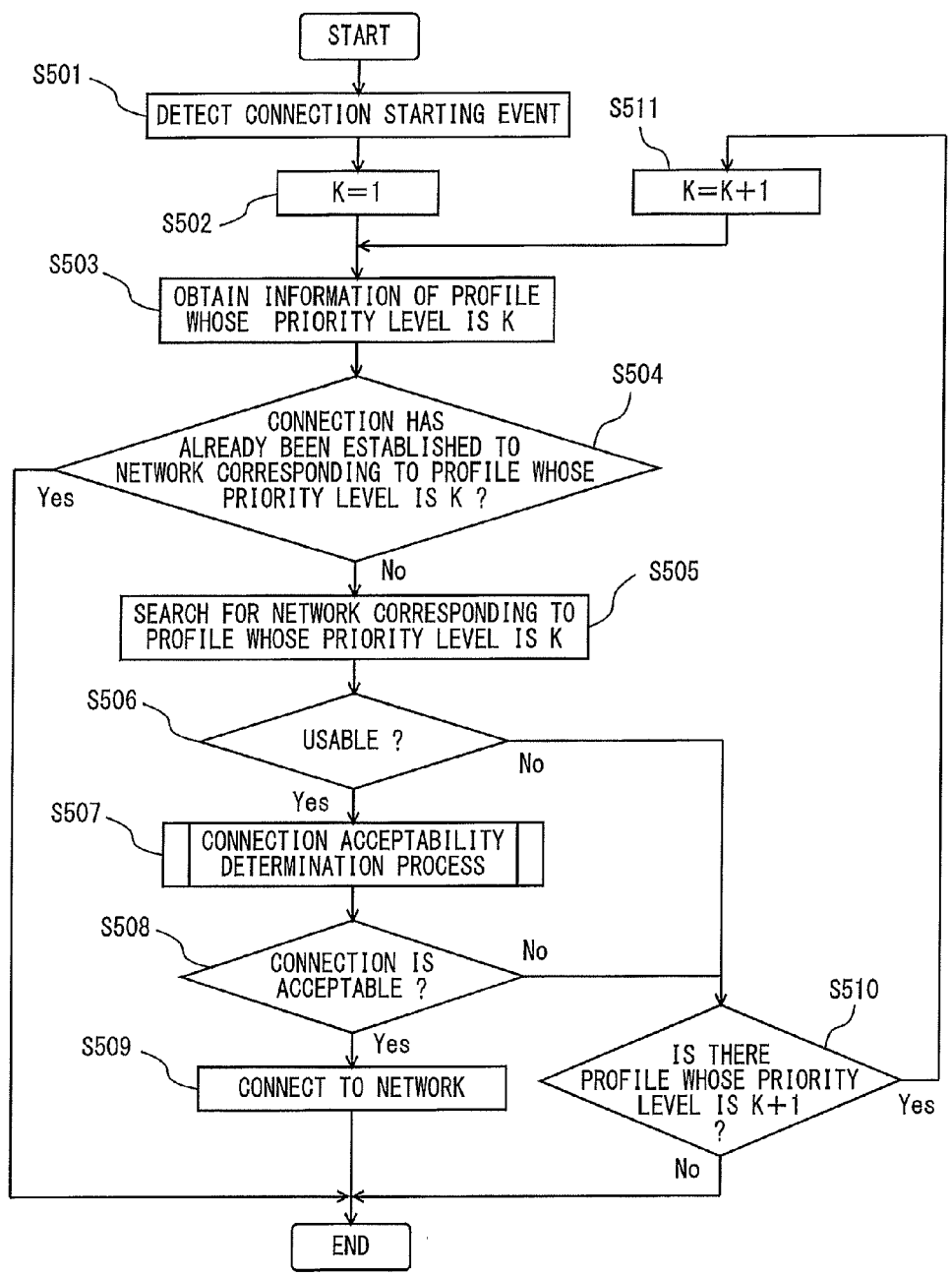
FIG. 5 is a flowchart showing the steps of an automatic connection process according to the first embodiment.

At S407 in FIG. 4 or 5509 in FIG. 5, before connection to a network 101, the network connection section 202 may inform the user of the contents and result of the switching acceptability determination process at step S406 or step S507, confirm with the user whether connection to the network 101 is acceptable or unacceptable in either case of "switching is acceptable" or "switching is unacceptable", and connect to the network 101 only when the user has given approval.

Although an example in which the switching restriction method designation section 208 designates "prohibition of network switching" as the switching restriction method has been described, the technology of the present disclosure is not limited to such a configuration. For example, a switching restriction method of "confirming with a user whether switching is acceptable or not and performing switching when the user has given approval" may be employed.

Furthermore, in the present embodiment, an example in which the network connection device 100 operates in the manual connection mode or the automatic connection mode has been described. However, automatic connection and manual connection may be combined, for example, in such a way that automatic connection is performed in accordance with the automatic connection priority levels when a profile contained in the profile list 300 and corresponding to a specific network type, specific network device identification information, and specific network device identification information is usable, and manual connection is performed for the other profiles. In addition, in the case where operation is performed by switching between the automatic connection mode and the manual connection mode, position detection means using GPS (Global Positioning System) may be provided so as to automatically perform switching between the automatic connection mode and the manual connection mode in accordance with the position of the network connection device 100. As conditional factors for automatic switching between the automatic connection mode and the manual connection mode, there are various conditional factors, including not only positional information obtained by GPS or the like, but also: the CPU load of the network connection device 100 or of a system including the network connection device 100 such as a personal computer; the remaining power of a battery used for driving the device or the system; whether or not a battery is used for driving the device or the system; and whether or not a specific AP has been detected.

Although the present embodiment has been described on the assumption that the disconnection-caused disadvantage determination section 206 determines that switching is unacceptable with respect to operations leading to termination of connection via a PAN which should not occur, the present disclosure is not limited thereto. It may be determined that switching is unacceptable with respect to operations that will not lead to termination of connection via a PAN but lead to reduction in the communication quality of the PAN. Examples of the case where the communication quality of a PAN is reduced include a case where connection is switched to a network when the radio-frequency band used for the network to which connection is switched overlaps or is close to the radio-frequency band used for the PAN.

Alternatively, when there is a possibility that communication is performed by a PAN, the connection mode control section 2041 may perform switching to the manual connection mode. Specifically, when it has been detected in the automatic connection mode that a PAN has been formed or preparation of the PAN control section 209 for forming a PAN has been completed, the connection mode control section 2041 switches the connection mode to the manual connection mode. Furthermore, when a PAN has been formed or preparation of the PAN control section 209 for forming a PAN has been completed in the manual connection mode, the connection mode control section 2041 may also determine not to perform switching to the automatic connection mode. That is, only when connection via a PAN has not been made or preparation for connection via a PAN has not been completed, operation in the automatic connection mode is permitted. Thus, network switching in the automatic connection mode that will cause termination of connection via a PAN can be prevented with more certainty.

When network connection has been made without control by the network connection section 202, the connection mode control section 2041 may detect the network connection and switch the connection mode to the manual connection mode. Specifically, when it has been detected in the automatic connection mode that network connection has been made without control by the network connection section 202, the connection mode control section 2041 switches the connection mode to the manual connection mode. In addition, when network connection has been made without control by the network connection section 202 in the manual connection mode, the connection mode control section 2041 does not perform switching to the automatic connection mode. In addition, when it has been detected, in the automatic connection mode or the manual connection mode, that network connection has been made without control by the network connection section 202, the connection mode control section 2041 may switch the connection mode not to the automatic connection mode or the manual connection mode, but to a connecting-function-suspended mode in which operation for connection to a network performed by the network connection section 202 is suspended. In this case, for example, when a user establishes connection to a network by using a network connection software manufactured by a third party, network connection by the network connection section 202 is not performed. Accordingly, it becomes possible to avoid a situation where both the network connection software and the network connection section 202 operate, and network connection state unintended by the user arises. In addition, when it has been detected that a user has activated a predetermined software such as a network connection software manufactured by a third party, the connection mode control section 2041 may switch the connection mode to the manual connection mode or the connecting function-suspended mode described above. In this case, for example, it becomes possible to avoid a situation where, when the user attempts to start using a network connection software manufactured by a third party, network connection by the network connection section 202 or the like precludes the use.

Although the technology of the present disclosure has been described based on the above embodiment, it should be understood that the technology of the present disclosure is not limited to the above embodiment. The following cases are also included in the technical scope of the present disclosure.

(1) Each of the devices described above is specifically a computer system including a microprocessor, a ROM, a RAM, a hard disk unit, a display unit, a keyboard, a mouse, and the like. A computer program is stored on the RAM or the hard disk unit. The functions of each device are carried out by the microprocessor operating in accordance with the computer program. Here, the computer program is formed by a combination of multiple instruction codes indicating instructions to the computer in order to carry out predetermined functions.

(2) Some or all the components included in each of the devices described above may be formed from a single system LSI (Large Scale Integration). The system LSI is a super-multifunctional LSI manufactured by integrating multiple component sections on a single chip, and is specifically a computer system including a microprocessor, a ROM, a RAM, and the like. A computer program is stored on the RAM. The functions of the system LSI are carried out by the microprocessor operating in accordance with the computer program.

(3) Some or all the components included in each of the devices described above may be formed from an IC card or a stand-alone module that is detachable from the devices. The IC card or the module is a computer system including a microprocessor, a ROM, a RAM, and the like. The IC card or the module may include the super-multifunctional LSI described above. The functions of the IC card or the module are carried out by the microprocessor operating in accordance with a computer program. The IC card or the module may be tamper resistant.

(4) The technology according to the present disclosure may be considered as methods executed by some or all the components described above. Furthermore, the methods may be provided in the form of a computer program executed by a computer or may be provided in the form of a digital signal including a computer program.

Furthermore, the technology according to the present disclosure may be provided in the form of a non-transient computer-readable storage medium, such as a flexible disk, a hard disk, a CD-ROM, a MO, a DVD, a DVD-ROM, a DVD-RAM, a BD (Blu-ray Disc (registered trademark)), and a semiconductor memory, on which a computer program or a digital signal is stored. Furthermore, the technology according to the present disclosure may be considered as the digital signal stored on any one of these storage media.

Furthermore, the computer program or the digital signal may be transmitted via an electric telecommunication line, a wireless or wired communication line, a network represented by the Internet, data broadcasting, and the like.

Furthermore, the technology according to the present disclosure may be provided in the form of a computer system including a microprocessor and a memory. The memory stores the computer program, and the microprocessor operates in accordance with the computer program.

Furthermore, the program or the digital signal may be processed on another independent computer system by being transferred via a storage medium, a network, or the like.

(5) The above embodiment and modification examples may be combined with one another.

Second Embodiment

FIG. 7 is a diagram illustrating an environment in which a network connection device 700 according to a second embodiment operates.

In FIG. 7, the environment in which the network connection device 700 operates includes one or more networks 101, and the networks 101 are networks which are similar to those in the first embodiment and to which the network connection device 700 can connect.

Figure 8:
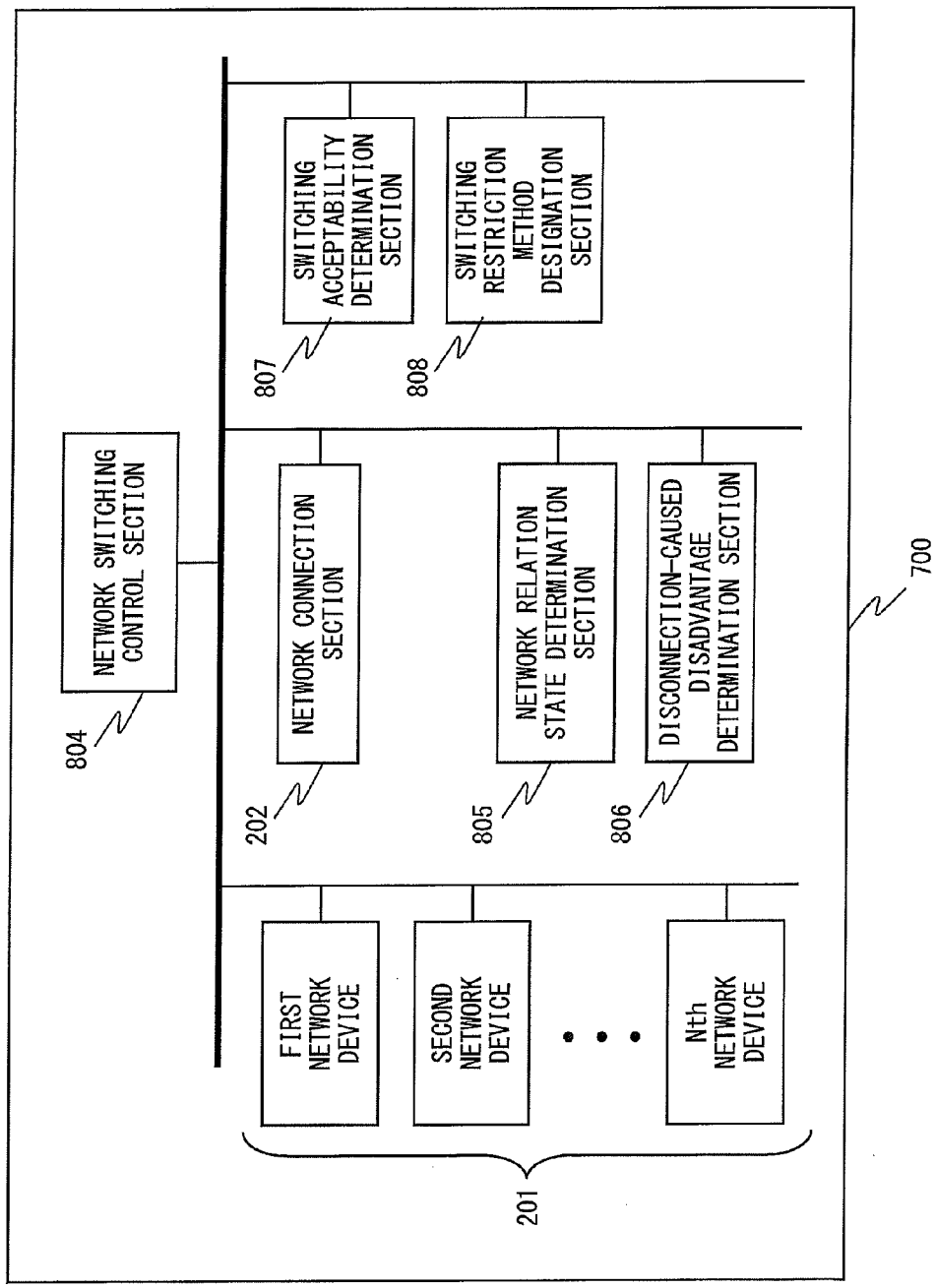
FIG. 8 is a block diagram showing a configuration of the network connection device 700 according to the second embodiment.

Next, the overall configuration of the network connection device 700 will be described with reference to FIG. 8. In FIG. 8, the network connection device 700 includes one or more network devices 201, a network connection section 202, a network switching control section 804, a network relation state determination section 805, a disconnection-caused disadvantage determination section 806, a switching acceptability determination section 807, and a switching restriction method designation section 808.

Among these components, substantially the same components as those described in the first embodiment will not be repeatedly described.

Based on user input means which is not shown and using any one of the network devices 201, the network switching control section 804 determines any one of the connectable networks 101 as a candidate network to which connection is to be switched.

When connection to any one of the networks is currently established, the network relation state determination section 805 determines whether or not data is being transmitted continuously by using the network. Examples of "data is being transmitted continuously" include, but not limited to, cases where, when the network connection device 700 is a personal computer or one of its components, or when the network connection device 700 is used by being connected to an electronic device such as a personal computer, a data file is being downloaded or uploaded, or streaming data of a video image continues to be received.

Based on a network determined by the network switching control section 804 as a candidate network to which connection is to be switched and based on the result of determination by the network relation state determination section 805, the disconnection-caused disadvantage determination section 806 determines whether or not disconnection from a network to which connection is currently established will cause a disadvantage to the user.

The switching acceptability determination section 807 determines the acceptability of network switching in accordance with a method for restricting the network switching designated by the switching restriction method designation section 808 described below.

When the network switching control section 804 has determined a candidate network to which connection is to be switched, the switching restriction method designation section 808 designates, as a switching restriction method used in the case where the disconnection-caused disadvantage determination section 806 determines that disconnection from the network to which connection is currently established will cause a disadvantage to the user, a method of determining whether network switching is acceptable or unacceptable based on the result of inquiring of the user whether network switching is acceptable or unacceptable via means which is not shown.

Figure 9:
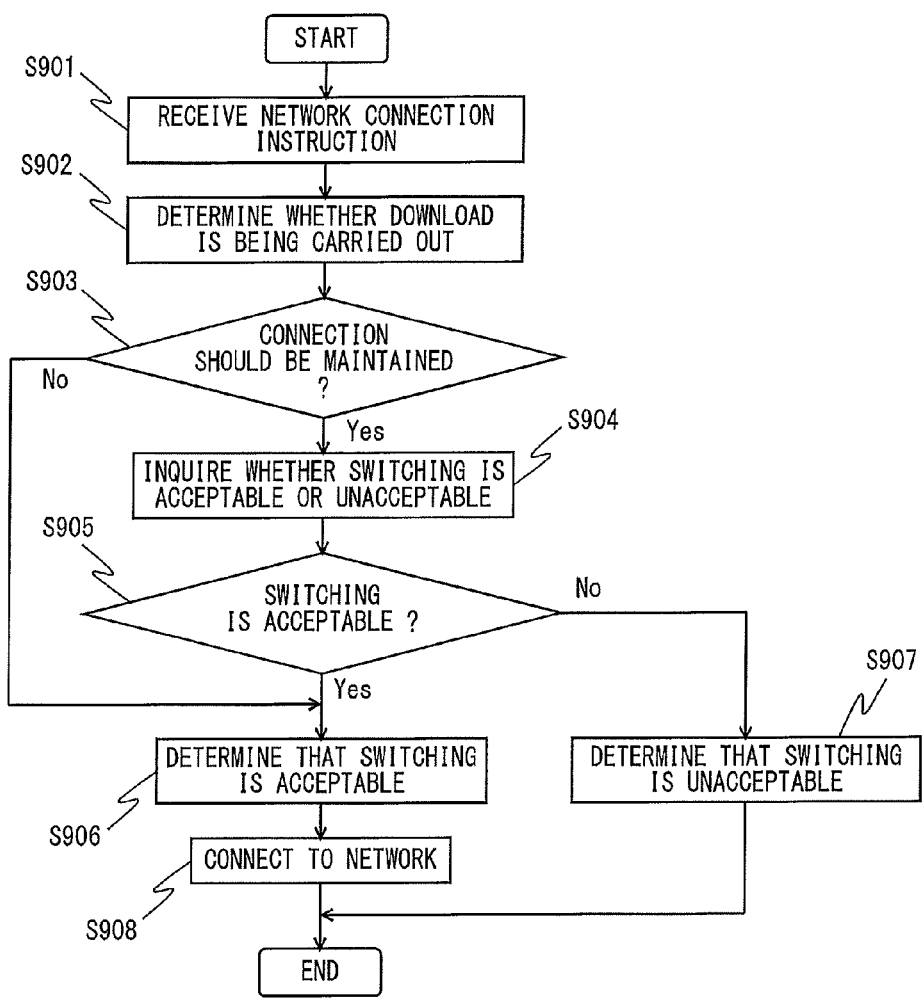
FIG. 9 is a flowchart showing the operation of the network connection device 700 according to the second embodiment.

Next, the operation of the network connection device 700 according to the present embodiment will be described with reference to the flowchart in FIG. 9.

S901: The network switching control section 804 receives an instruction for connection to one (defined as a network NW21) of the networks 101 which is inputted by the user via input means such as a keyboard which is not shown, and then the process proceeds to step S902.

S902: The network relation state determination section 805 determines whether or not a data file is being downloaded via a network (defined as a network NW22) to which connection is currently established, and then the process proceeds to step S903.

S903: If a data file is being downloaded via the network NW22, the disconnection-caused disadvantage determination section 806 determines that disconnection from the network NW22 will cause a disadvantage to the user, and then the process proceeds to step S904. Otherwise, the disconnection-caused disadvantage determination section 806 determines that disconnection from the network NW22 will cause no disadvantage to the user, and then the process proceeds to step S906.

S904: The switching acceptability determination section 807 inquires of the user whether switching is acceptable or unacceptable, in accordance with designation by the switching restriction method designation section 808, and then the process proceeds to step S905.

S905: When the user replies that "switching is acceptable", the process proceeds to step S906, and when the user replies that "switching is unacceptable", the process proceeds to step S907.

S906: The switching acceptability determination section 807 determines that switching to the network NW21 is acceptable, and then the process proceeds to step S908.

S907: The switching acceptability determination section 807 determines that switching to the network NW21 is unacceptable, and then the process ends.

S908: The network connection section 202 disconnects from the network NW22 and connects to the network NW21 via a network device 201, and then the process ends.

As described above, according to the present embodiment, the network relation state determination section determines whether a data file is being downloaded, and if a data file is being downloaded, disconnection from a network is prohibited. Therefore, it becomes possible to prevent such a disadvantage to the user that download is interrupted by disconnection from a network, and the download has to be performed again after connection to another network is established.

In the detailed description of the present embodiment, when connection to any one the networks is currently established, the network relation state determination section 805 determines whether or not data is being transmitted continuously, and by using the determination result, the disconnection-caused disadvantage determination section 806 determines whether or not disconnection from the network to which connection is currently established will cause a disadvantage to the user. However, the contents of the determination by the network relation state determination section 805 and the conditions for the determination by the disconnection-caused disadvantage determination section 806 according to the present disclosure are not limited to those described above. The network relation state determination section 805 may determine a predetermined physical quantity related to a network to which connection is currently established and/or a network determined by the network switching control section as a candidate network to which connection is to be switched, and when the physical quantity satisfies a predetermined condition, the disconnection-caused disadvantage determination section 806 may determine that disconnection from the network will cause a disadvantage to the user. For example, the network relation state determination section 805 may determine a received signal strength indication (RSSI) of a network to which connection is to be switched, and in the case where the received signal strength indication of the candidate network to which connection is to be switched is smaller than a predetermined value and the connection to the candidate network will therefore be easily broken even if network switching is performed, the disconnection-caused disadvantage determination section 806 may determine that the switching will cause a disadvantage to the user.

Alternatively, the contents of the determination by the network relation state determination section 805 and the conditions for the determination by the disconnection-caused disadvantage determination section 806 may be as follows. That is, the network relation state determination section 805 may determine a money cost related to a network to which connection is currently established and/or a network determined by the network switching control section as a candidate network to which connection is to be switched, and when the money cost satisfies a predetermined condition, the disconnection-caused disadvantage determination section 806 may determine that disconnection from the network will cause a disadvantage to the user. For example, the network relation state determination section 805 may determine a connection fee (defined as a fee C21) for a network to which connection is to be switched and a connection fee (defined as a fee C22) for a network to which connection is currently established, and in the case where the fee C21 is greater than the fee C22 and the cost for connection will therefore be increased by network switching, the disconnection-caused disadvantage determination section 806 may determine that the switching will cause a disadvantage to the user.

Third Embodiment

Figure 10:
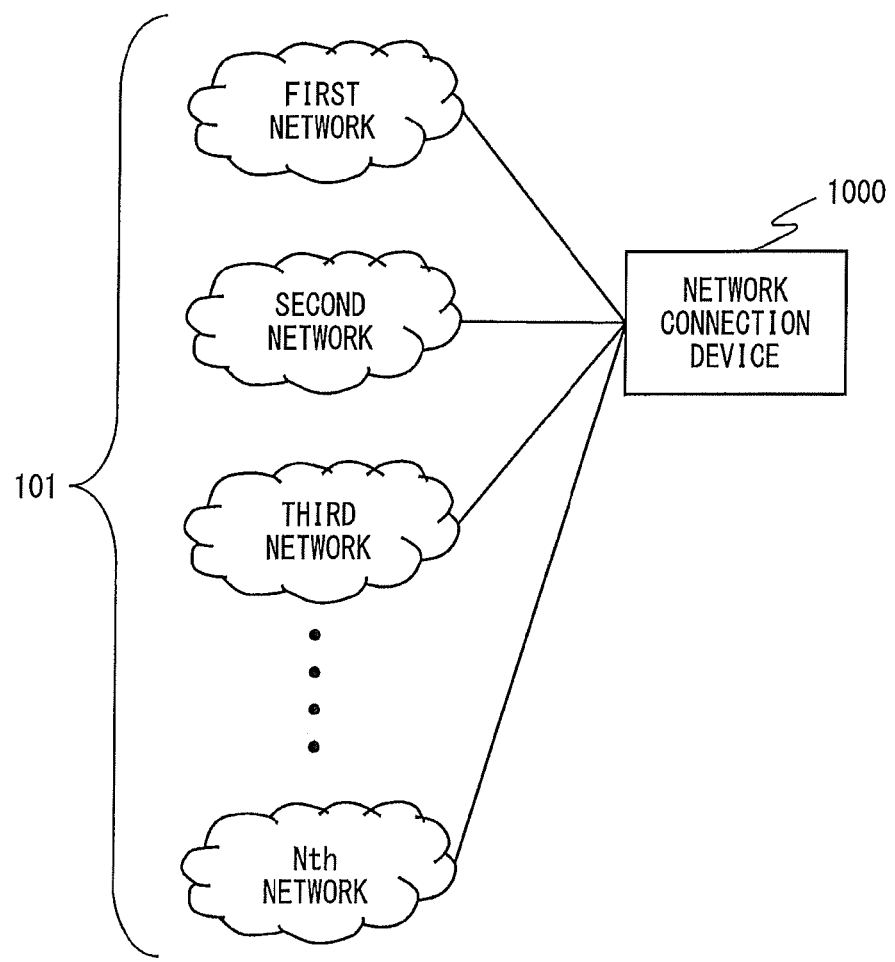
FIG. 10 is a diagram illustrating an environment in which a network connection device 1000 according to a third embodiment operates.

FIG. 10 is a diagram illustrating an environment in which a network connection device 1000 according to a third embodiment operates.

In FIG. 10, the environment in which the network connection device 1000 operates includes one or more networks 101. The networks 101 are similar to those in the first embodiment and the second embodiment, and are networks to which the network connection device 1000 can connect.

Figure 11:
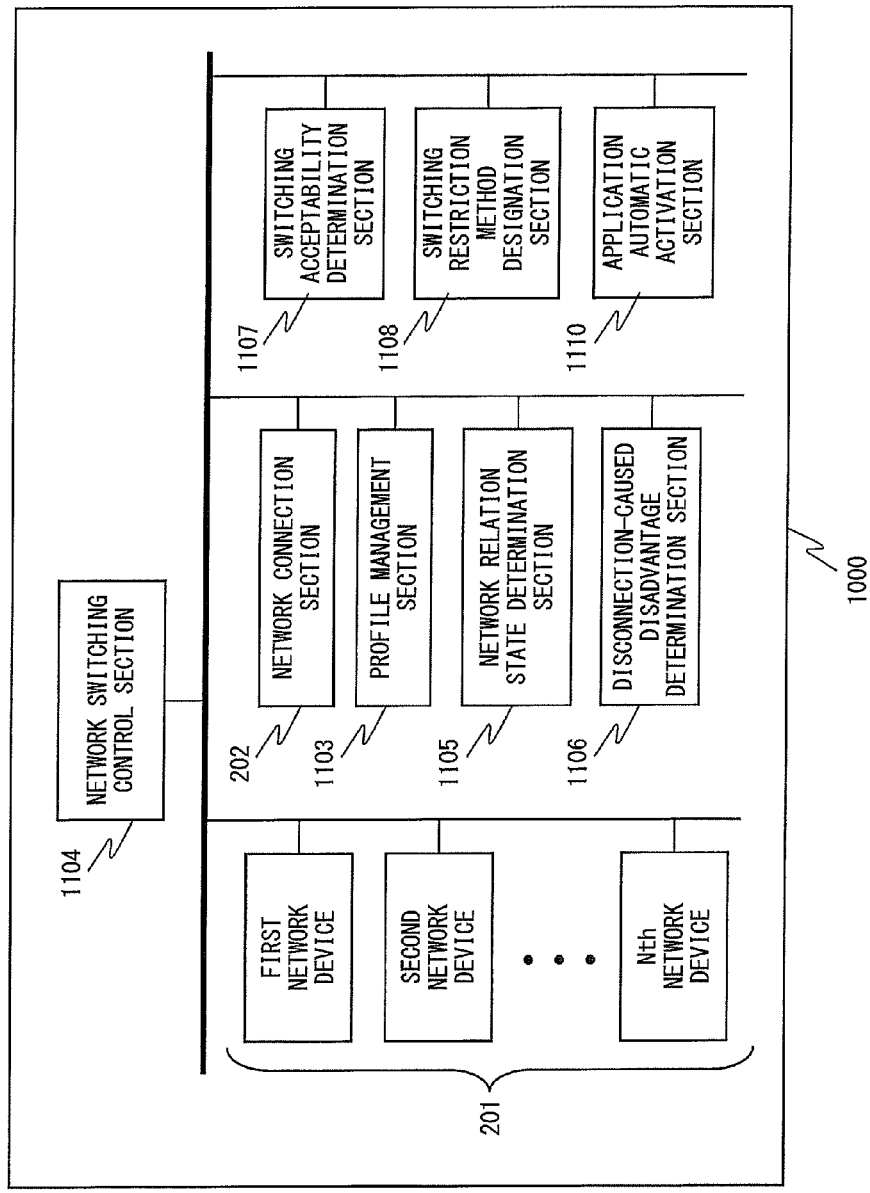
FIG. 11 is a block diagram showing a configuration of the network connection device 1000 according to the third embodiment.

Next, the overall configuration of the network connection device 1000 will be described with reference to FIG. 11. In FIG. 11, the network connection device 1000 includes network devices 201, a network connection section 202, a profile management section 1103, a network switching control section 1104, a network relation state determination section 1105, a disconnection-caused disadvantage determination section 1106, a switching acceptability determination section 1107, a switching restriction method designation section 1108, and an application automatic activation section 1110.

Among these components, substantially the same components as those described in the first embodiment will not be repeatedly described.

The profile management section 1103 manages profiles that contain various information needed when connection to the networks 101 is made and other additional information, and also manages a profile list 1200 described later with reference to FIG. 12. In the present embodiment, the various information of the profiles are set by a user.

The network switching control section 1104 selects, from among the profiles managed by the profile management section 1103, one profile that contains information needed for connection to a candidate network to which connection is next made, in accordance with an instruction made by the user via means which is not shown.

When connection to any one of the networks is currently established, the network relation state determination section 1105 determines whether or not an application activated automatically at the time of connection to the network by the application automatic activation section 1110 described later continues to run.

Based on a network determined by the network switching control section 1104 as a candidate network to which connection is to be switched and based on the result of determination by the network relation state determination section 1105, the disconnection-caused disadvantage determination section 1106 determines whether or not disconnection from the network to which connection is currently established will cause a disadvantage to the user.

The switching acceptability determination section 1107 determines whether network switching is acceptable or unacceptable in accordance with a method for restricting network switching designated by the switching restriction method designation section 1108 described below.

Although not shown in the drawings, when the network switching control section 1104 has determined a candidate network to which connection is to be switched, the switching restriction method designation section 1108 designates, as a switching restriction method used in the case where the disconnection-caused disadvantage determination section 1106 determines that disconnection from the network to which connection is currently established will cause a disadvantage to the user, a method of determining whether network switching is acceptable or unacceptable based on the result of inquiring of the user whether network switching is acceptable or unacceptable.

In accordance with information of a profile contained in the profile management section 1103, the application automatic activation section 1110 activates an application designated as an at-connection automatically-activated application 1209 of the profile at the time when the network connection device 1000 connects to a network 101.

Next, the profile list 1200 managed by the profile management section 1103 will be described.

FIG. 12 is a diagram showing an example of the profile list 1200. Profiles listed in the profile list 1200 each include a profile name 1201, a network type 1204, network device identification information 1205, network identification information 1206, authentication/encryption information 1207, and an at-connection automatically-activated application 1209. Hereinafter, each of the components will be described.

The profile name 1201 indicates the name of a profile. The network type 1204 is information indicating the type of a network 101 to which connection is made by using the profile. The network device identification information 1205 is information for specifying a network device 201 used when network connection is made by using the profile. The network identification information 1206 is information for specifying a network 101 to which connection is made by using the profile. The authentication/encryption information 1207 is information about authentication/encryption needed when connection to a network 101 is made by using the profile. The at-connection automatically-activated application 1209 is information indicating an application automatically activated by the application automatic activation section 1110 when connection to a network 101 is made by using the profile.

Figure 13:
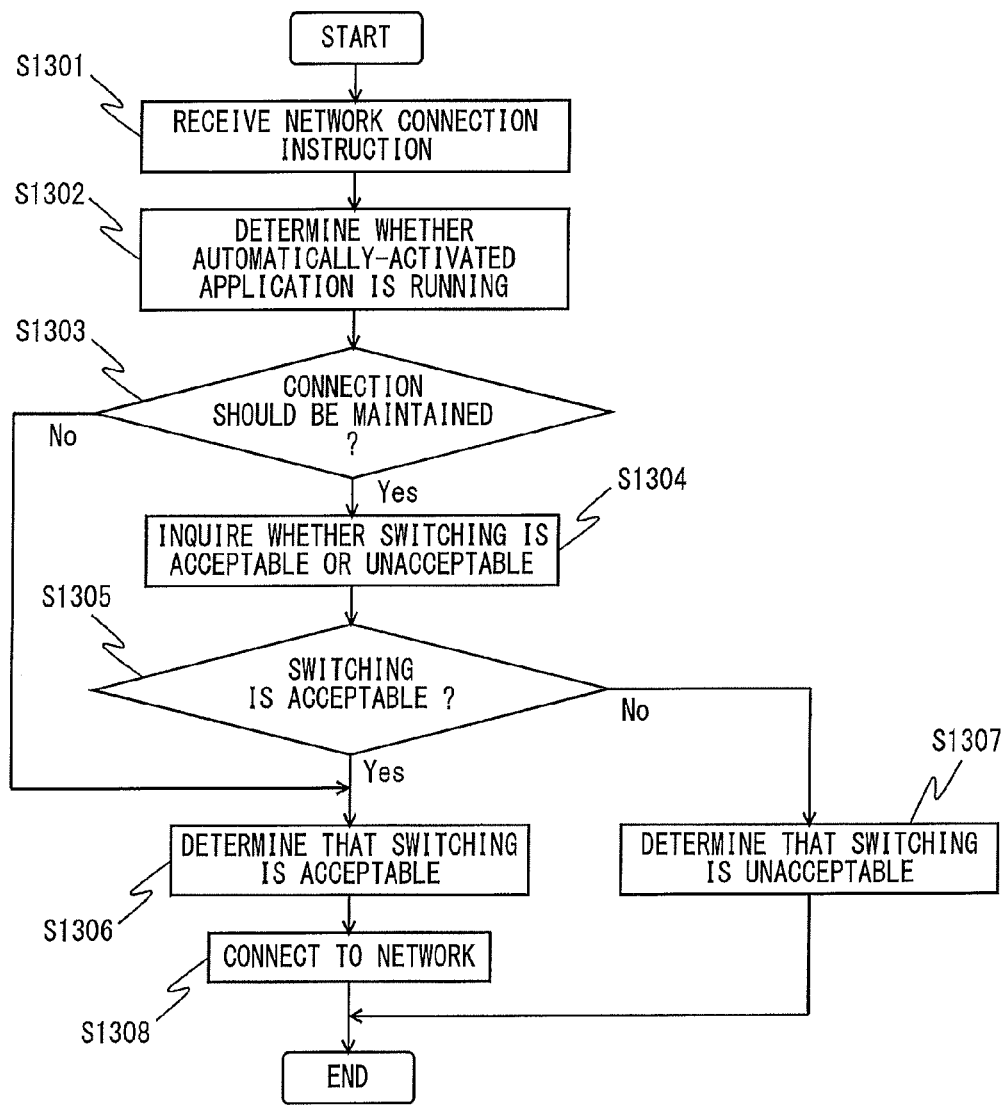
FIG. 13 is a flowchart showing the operation of the network connection device 1000 according to the third embodiment.

Next, the operation of the network connection device 1000 according to the present embodiment will be described with reference to the flowchart in FIG. 13.

S1301: The network switching control section 1104 receives an instruction for connection to a network (defined as a network NW31) designated by a profile (defined as a profile P3) selected from among the profiles stored in the profile management section 1103 by a user via input means such as a keyboard which is not shown, and then the process proceeds to step S1302.

S1302: The network relation state determination section 1105 determines whether or not an application (defined as an application A3) automatically activated by the application automatic activation section 1110 at the time when the current connection to a network (defined as a network NW32) has been established continues to run, and then the process proceeds to step S1303. The application A3 is a business system which is activated after connection to a network is established and for which log-on using authentication based on a user ID and a password is required.

S1303: If the application A3 is running, the disconnection-caused disadvantage determination section 1106 determines that disconnection from the network NW32 will cause a disadvantage to the user, and then the process proceeds to step S1304. Otherwise, the disconnection-caused disadvantage determination section 1106 determines that disconnection from the network NW3 will cause no disadvantage to the user, and then the process proceeds to step S1306.

S1304: The switching acceptability determination section 1107 inquires of the user whether the switching is acceptable or unacceptable in accordance with designation by the switching restriction method designation section 1108, and then the process proceeds to step S1305.

S1305: When the user replies that "switching is acceptable", the process proceeds to step S1306, and when the user replies that "switching is unacceptable", the process proceeds to step S1307.

S1306: The switching acceptability determination section 1107 determines that the switching to the network NW31 is acceptable, and then the process proceeds to step S1308.

S1307: The switching acceptability determination section 1107 determines that the switching to the network NW31 is unacceptable, and then the process ends.

S1308: The network connection section 202 disconnects from the network NW32, and connects to the network NW31 via a network device 201. In addition, in the case where an application is designated as the at-connection automatically-activated application 1209 in the profile P3, the application is activated, and then the process ends.

As described above, according to the present embodiment, the application automatic activation section automatically activates a previously-designated application at the time of connection to a network, and disconnection from the network is prohibited while the application is running. Accordingly, in the case where, for example, an application requiring user authentication including input of a user ID and a password before the application starts to be actually used after activation is employed, it is possible to prevent such a disadvantage to the user that disconnection from a network temporarily occurs, and thus costs such as time and operation overhead are incurred to use the same application again.

In the description of the present embodiment, the network relation state determination section 1105 determines whether or not an application automatically activated by the application automatic activation section 1110 at the time when the current network connection has been established continues to run. However, the target for determination is not limited to an automatically-activated application. For example, whether or not an application previously designated by the user is running may be separately determined.

Furthermore, in the description of the present embodiment, the application activated by the application automatic activation section is a business system that requires log-on using authentication based on a user ID and a password. However, another application, for example, a client software for VPN (Virtual Private Network), may be activated by the application automatic activation section.

Fourth Embodiment

FIG. 14 is a diagram illustrating an environment in which a network connection device 1400 according to a fourth embodiment operates.

In FIG. 14, the environment in which the network connection device 1400 operates includes one or more networks 101, and the networks 101 are networks which are similar to those in the first embodiment and to which the network connection device 1400 can connect.

Figure 15:
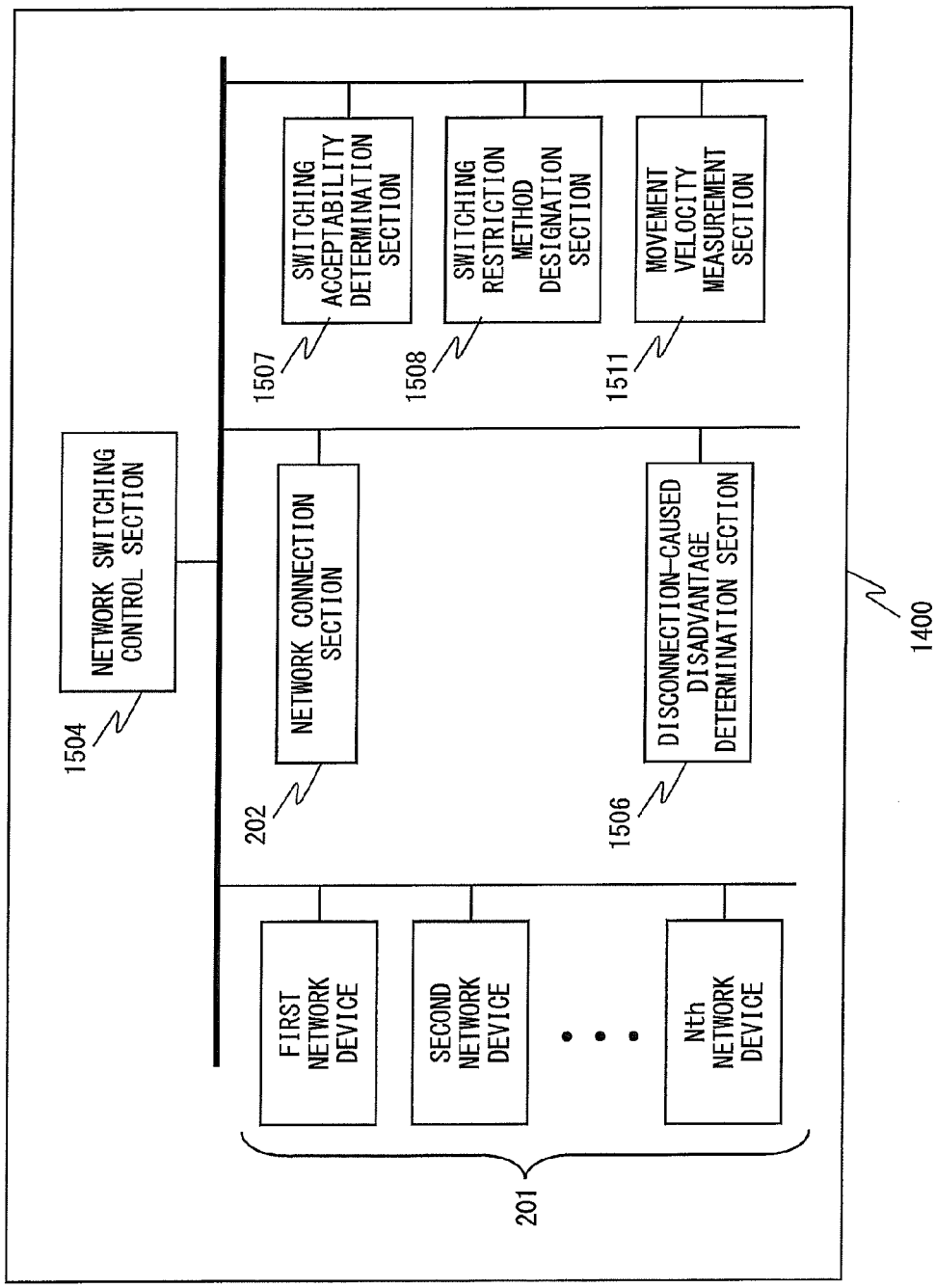
FIG. 15 is a block diagram showing a configuration of the network connection device 1400 according to the fourth embodiment.

Next, the overall configuration of the network connection device 1400 will be described with reference to FIG. 15. In FIG. 15, the network connection device 1400 includes network devices 201, a network connection section 202, a network switching control section 1504, a disconnection-caused disadvantage determination section 1506, a switching acceptability determination section 1507, a switching restriction method designation section 1508, and a movement velocity measurement section 1511.

Among these components, substantially the same components as those described in the first embodiment will not be repeatedly described.

Based on user input means which is not shown and using any one of the network devices 201, the network switching control section 1504 determines any one of the connectable networks 101 as a candidate network to which connection is to be switched.

Based on the network determined by the network switching control section 1504 as a candidate network to which connection is to be switched and based on the movement velocity of the network connection device 1400 measured by the movement velocity measurement section 1511, the disconnection-caused disadvantage determination section 1506 determines whether or not disconnection from a network to which connection is currently established will cause a disadvantage to the user. Specifically, in the case where the movement velocity of the network connection device 1400 is greater than a predetermined value, the disconnection-caused disadvantage determination section 1506 determines that disconnection from the network to which connection is currently established will cause a disadvantage to the user, and in other cases, the disconnection-caused disadvantage determination section 1506 determines that the disconnection will cause no disadvantage to the user.

The switching acceptability determination section 1507 determines whether network switching is acceptable or unacceptable in accordance with a method for restricting network switching designated by the switching restriction method designation section 1508 described below.

When the network switching control section 1504 has determined a candidate network to which connection is to be switched, the switching restriction method designation section 1508 designates, as a switching restriction method used in the case where the disconnection-caused disadvantage determination section 1506 determines that disconnection from the network to which connection is currently established will cause a disadvantage to the user, a method of determining whether network switching is acceptable or unacceptable based on the result of inquiring of the user whether network switching is acceptable or unacceptable via means which is not shown.

The movement velocity measurement section 1511 measures the movement velocity of the network connection device 1400. Examples of methods for measuring the movement velocity include, but not limited to, a method using a GPS (Global Positioning System).

Next, the operation of the network connection device 1400 according to the present embodiment will be described with reference to the flowchart in FIG. 16.

S1601: The network switching control section 1504 receives an instruction for connection to one (defined as a network NW41) of the networks 101 which is inputted by a user via input means such as a key board which is not shown, and then the process proceeds to step S1602.

S1602: The movement velocity measurement section 1511 measures a movement velocity (defined as a velocity V41) of the network connection device 1400, and then the process proceeds to step S1603.

S1603: If the velocity V41 is greater than a velocity V42, the disconnection-caused disadvantage determination section 1606 determines that disconnection from a network (defined as a network NW42) to which connection is currently established will cause a disadvantage to the user, and then the process proceeds to step S1604. Otherwise, the disconnection-caused disadvantage determination section 1506 determines that disconnection from the network NW42 will cause no disadvantage to the user, and then the process proceeds to step S1606.

S1604: The switching acceptability determination section 1507 inquires of the user whether switching is acceptable or unacceptable in accordance with designation by the switching restriction method designation section 1508, and then the process proceeds to step S1605.

S1605: When the user replies that "switching is acceptable", the process proceeds to step S1606, and when the user replies that "switching is unacceptable", the process proceeds to step S1607.

S1606: The switching acceptability determination section 1507 determines that switching to the network NW41 is acceptable, and then the process proceeds to step S1608.

S1607: The switching acceptability determination section 1507 determines that switching to the network NW41 is unacceptable, and then the process ends.

S1608: The network connection section 1502 disconnects from the network NW42, and connects to the network NW41 via a network device 201, and then the process ends.

As described above, according to the present embodiment, when the network connection device moves at a velocity greater than a predetermined velocity, disconnection from a network to which connection is currently established is prohibited. Therefore, it becomes possible to prevent such a disadvantage to the user that the network connection device is within a range of WLAN network and thus connectable to WLAN network at a moment, and then immediately moves out of the range and becomes unconnectable to the network.

Furthermore, if the network switching control section is configured to automatically extract a candidate network to which connection is to be switched from among a plurality of usable networks by performing an operation similar to that of the automatic connection control section 2043 described in the first embodiment, it is possible to provide the effect of preventing network disconnection from frequently occurring due to frequent switching between the usable networks during high-velocity movement of the network connection device.

The above description has been given on the assumption that the disconnection-caused disadvantage determination section 1606 determines that disconnection from a network to which connection is currently established will cause a disadvantage to the user when the velocity V41 is greater than the velocity V42. In addition, the type of the network to which connection is currently established may also be taken into account. For example, even when the velocity V41 is greater than the velocity V42, if the type of the network to which connection is currently established is WLAN, the disconnection-caused disadvantage determination section 1506 may determine that disconnection from the network will cause no disadvantage to the user, and if the type of the network to which connection is currently established is WWAN or WiMAX, the disconnection-caused disadvantage determination section 1506 may determine that disconnection from the network will cause a disadvantage to the user.

Fifth Embodiment

FIG. 17 is a diagram illustrating an environment in which a network connection device 1700 according to a fifth embodiment operates.

In FIG. 17, the environment in which the network connection device 1700 operates includes one or more networks 101, and the networks 101 are networks which are similar to those in the first embodiment and to which the network connection device 1700 can connect.

Figure 18:
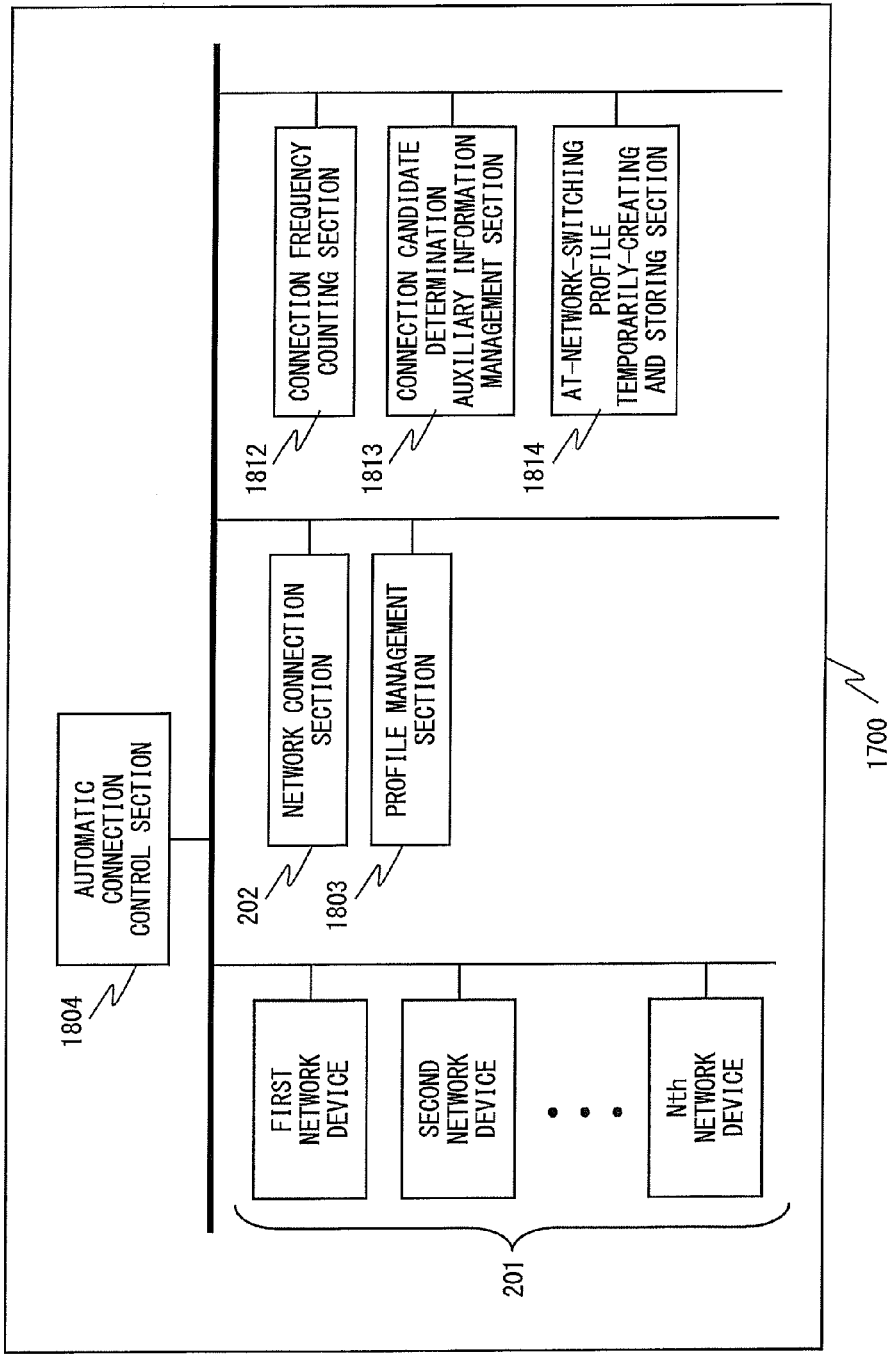
FIG. 18 is a block diagram showing a configuration of the network connection device 1400 according to the fifth embodiment.

Next, the overall configuration of the network connection device 1700 will be described with reference to FIG. 18. In FIG. 18, the network connection device 1700 includes network devices 201, a network connection section 202, a profile management section 1803, an automatic connection control section 1804, a connection frequency counting section 1812, a connection candidate determination auxiliary information management section 1813, and an at-network-switching profile temporarily-creating and storing section 1814.

Among these components, substantially the same components as those described in the first embodiment will not be repeatedly described.

The profile management section 1803 manages profiles that contains various information needed when connection to the networks 101 is made and other additional information, and also manages a profile list 1900 described later with reference to FIG. 19. In the present embodiment, the various information of the profiles are set by a user.

The automatic connection control section 1804 selects one profile that contains information needed for connection to a candidate network to which connection is next made, from among the profiles managed by the profile management section 1803, in accordance with automatic connection priority levels described later.

The connection frequency counting section 1812 counts, for each profile managed by the profile management section 1803, the number of times connection is made to a network designated by the profile.

Based on the counting by the connection frequency counting section 1812, the connection candidate determination auxiliary information management section 1813 manages connection frequency information 2000 that stores the cumulative number of times connection is made to each network designated by a corresponding one of the profiles managed by the profile management section 1803. The details of the connection frequency information will be described later with reference to FIG. 20. An initial value of the cumulative number of times is 0, and the cumulative number of times can be reset to 0 for each profile by using means which is not shown.

When the automatic connection control section 1804 selects a profile, the at-network-switching profile temporarily-creating and storing section 1814 creates and stores an at-network-switching profile list 2100 described later, based on the contents of the profile list 1900 managed by the profile management section 1803 and the connection frequency information 2000 managed by the connection candidate determination auxiliary information management section 1813.

Next, the profile list 1900 managed by the profile management section 1803 will be described. FIG. 19 is a diagram showing an example of the profile list 1900. In FIG. 19, each of the profiles listed in the profile list 1900 includes a profile name 1901, an automatic connection priority level 1903, a network type 1904, network device identification information 1905, network identification information 1906, and authentication/encryption information 1907. Hereinafter, each of the components will be described. The profile name 1901 indicates the name of a profile.

The automatic connection priority level 1903 is information indicating a priority level of the profile for use in network connection. In the present embodiment, the automatic connection control section 1804 uses the profiles in descending order of the priority levels at the time of network connection. When there are profiles having the same priority level, a profile for which the cumulative number of times of connection managed by the connection candidate determination auxiliary information management section 1813 is large is preferentially used. In the example of FIG. 19, the automatic connection priority levels 1903 is set as an integer value starting from "1", and "1" corresponds to the highest priority level. The greater the integer value is, the lower the priority level is. In addition, the automatic connection priority level 1903 may have the same value for a plurality of profiles. In this case, the profiles having the same priority level are ranked in priority based on the connection frequency information 2000 described later with reference to FIG. 20.

The network type 1904 is information indicating the type of a network 101 to which connection is made by using a profile. The network device identification information 1905 is information for specifying a network device used when network connection is made by using the profile. The network identification information 1906 is information for specifying a network 101 to which connection is made by using the profile. The authentication/encryption information 1907 is information about authentication/encryption needed when connection to a network 101 is made by using the profile.

In FIG. 19, the profile list 1900 lists five profiles whose profile names 1901 are "profile A", "profile B", "profile C", "profile D", and "profile E", respectively. The priority levels of "profile A", "profile B", and "profile C" for use in connection are 1, and the priority levels of "profile D" and "profile E" for use in connection are 2. The profile list 1900 indicates, for example, that the type of a network 101 to which connection is made by using "profile A" is "WLAN", a network device 201 used when network connection is made by using "profile A" is a "first network device", the network 101 to which connection is made by using "profile A" is a "first network", an authentication method used when connection to the network 101 is made by using "profile A" is "A", an encryption method is "AA", and information for authentication such as a network key is "AAA".

FIG. 20 is a diagram showing an example of the connection frequency information 2000 managed by the connection candidate determination auxiliary information management section 1813. The connection frequency information 2000 is a table composed of records corresponding to the profiles contained in the profile list managed by the profile management section 1803.

In FIG. 20, the reference numeral 2001 denotes profile names of the profiles contained in the profile list managed by the profile management section 1803. The reference numeral 2002 denotes the cumulative number of times of connection which indicates, for each profile contained in the profile list managed by the profile management section 1803, the cumulative number of times the network connection device 1700 connects to a network designated by the profile that has the corresponding profile name. In FIG. 20, the connection frequency information 2000 indicates that the cumulative numbers of times of connection to networks each designated by a corresponding one of the five profiles whose profile names 2001 are "profile A", "profile B", "profile C", "profile D", and "profile E" are 7, 15, 2, 6, and 3, respectively.

FIG. 21 is a diagram showing an example of the at-network-switching profile list 2100 created and stored by the at-network-switching profile temporarily-creating and storing section 1814.

In FIG. 21, the reference numerals 2101, 2104, 2105, 2106, and 2107 denote components similar to the profile name 1901, the network type 1904, the network device identification information 1905, the network identification information 1906, and the authentication/encryption information 1907 in the profile list 1900 described above with reference to FIG. 19. Based on the automatic connection priority level 1903 in the profile list 1900 and the connection frequency information 2000 managed by the connection candidate determination auxiliary information management section 1813, an automatic connection actual priority levels 2103 are set as integer values starting from "1" for all the profiles contained in the profile list 1900 such that the same actual priority level is not assigned to different profiles. The integer value "1" corresponds to the highest priority level. The larger the value is, the lower the priority level is. The method for assigning the automatic connection actual priority levels will be described in detail when the process for creating the at-network-switching profile list 2100 is described with reference to FIG. 23.

Figure 22:
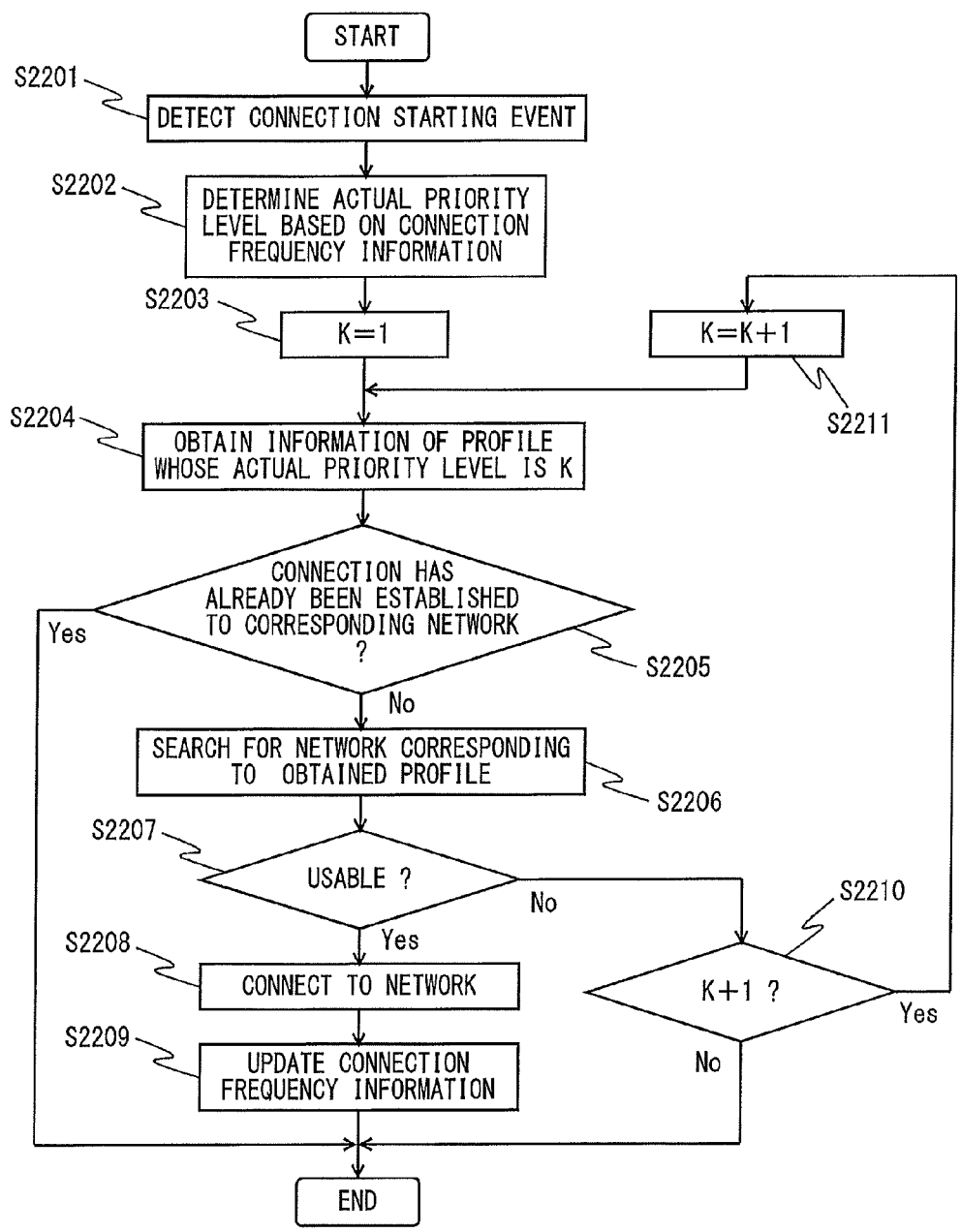
FIG. 22 is a flowchart showing the operation of the network connection device 1400 according to the fifth embodiment.

Next, the operation of the network connection device 1700 according to the present embodiment will be described with reference to the flowchart in FIG. 22.

S2201: The automatic connection control section 1804 detects an event acting as a trigger for staring a process for connection to a network 101 from step S2202. The event is generated at a similar time to when an event is generated at step S501 described in the first embodiment.

S2202: Based on the profile list 1900 managed by the profile management section 1803 and the connection frequency information 2000 managed by the connection candidate determination auxiliary information management section 1813, the at-network-switching profile temporarily-creating storing section 1814 creates and stores the at-network-switching profile list 2100. The process for creating the at-network-switching profile list 2100 will be described later with reference to FIG. 23.

S2203: The automatic connection control section 1804 sets K to 1 (K is an integer to be incremented within a range of 1≤K≤N, and N is the number of profiles) in order to perform step S2204 and the subsequent steps for the profile of which the automatic connection actual priority level 2103 in the at-network-switching profile list 2100 is "1", and then the process proceeds to step S2204.

S2204: The automatic connection control section 1804 refers to the at-network-switching profile list 2100, and obtains information of a profile (defined as a profile RP5-K) of which the automatic connection actual priority level 2103 is "K".

S2205: The automatic connection control section 1804 transfers the information of the profile RP5-K to the network connection section 202, and inquires of the network connection section 202 whether or not connection to a network 101 (defined as a network NW5-K) has already been established by using the profile RP5-K. The network connection section 202 determines whether or not connection to the network NW5-K has already been established, by using a network device 201 (defined as a network device ND5-K) specified by the network device identification information 2105 contained in the profile RP5-K. The network connection section 202 notifies the automatic connection control section 1804 of the determination result. When the determination result is "already connected", the automatic connection control section 1804 determines that connection to the network 101 has been established in accordance with the actual priority levels, and then ends the process without any change. When the determination result is "unconnected", the automatic connection control section 1804 proceeds to step S2206.

S2206: The automatic connection control section 1804 transfers the information of the profile RP5-K to the network connection section 202, and requests the network connection section 202 to search for the network 101 to which connection is made by using the profile RP5-K. The network connection section 202 searches for the network NW5-K by using the network device ND5-K, and determines whether or not the network NW5-K is usable.

S2207: When the determination result is "unusable", the network connection section 202 notifies the automatic connection control section 1804 of the determination result and the reason therefor. When the determination result received from the network connection section 202 is "usable", the automatic connection control section 1804 transfers the information of the profile RP5-K to the network connection section 202, and instructs the network connection section 202 to connect to the network NW5-K. When the determination result received from the network connection section 202 is "unusable", the automatic connection control section 1804 proceeds to step S2210.

S2208: The network connection section 202 connects to the network NW5-K by using the network device ND5-K. The network connection section 202 uses the contents described in the authentication/encryption information 2107 contained in the profile RP5-K as authentication/encryption-related information needed for the connection. When the cell of the authentication/encryption information 2107 is blank or when additional information is needed, an inquiry is made to the user to obtain information. When connection to a network 101 other than the network NW5-K has already been established, the network connection section 202 disconnects from the other network 101.

S2209: The connection frequency counting section 1812 obtains a profile name 2101 (defined as a profile name RPN5-K (1≤K≤N)) of the profile RP5-N, and increments by 1 the value of the cumulative number of times of connection 2002 in the record for which the profile name 2001 is RPN5-K in the connection frequency information 2000 managed by the connection candidate determination auxiliary information management section 1813, and then the process ends.

S2210: The automatic connection control section 1804 refers to the at-network-switching profile list 2100 managed by the at-network-switching profile temporarily-creating storing section 1814, and confirms the presence or absence of a profile of which the automatic connection actual priority level 2103 is "K+1". When the profile of which the automatic connection actual priority level 2103 is "K+1" is proved to be absent as a result of the confirmation, the process ends without any change. When the profile of which the automatic connection actual priority level 2103 is "K+1" is present, the process proceeds to step S2211.

S2211: The automatic connection control section 1804 sets K to K+1, and then the process proceeds to step S2204.

Figure 23:
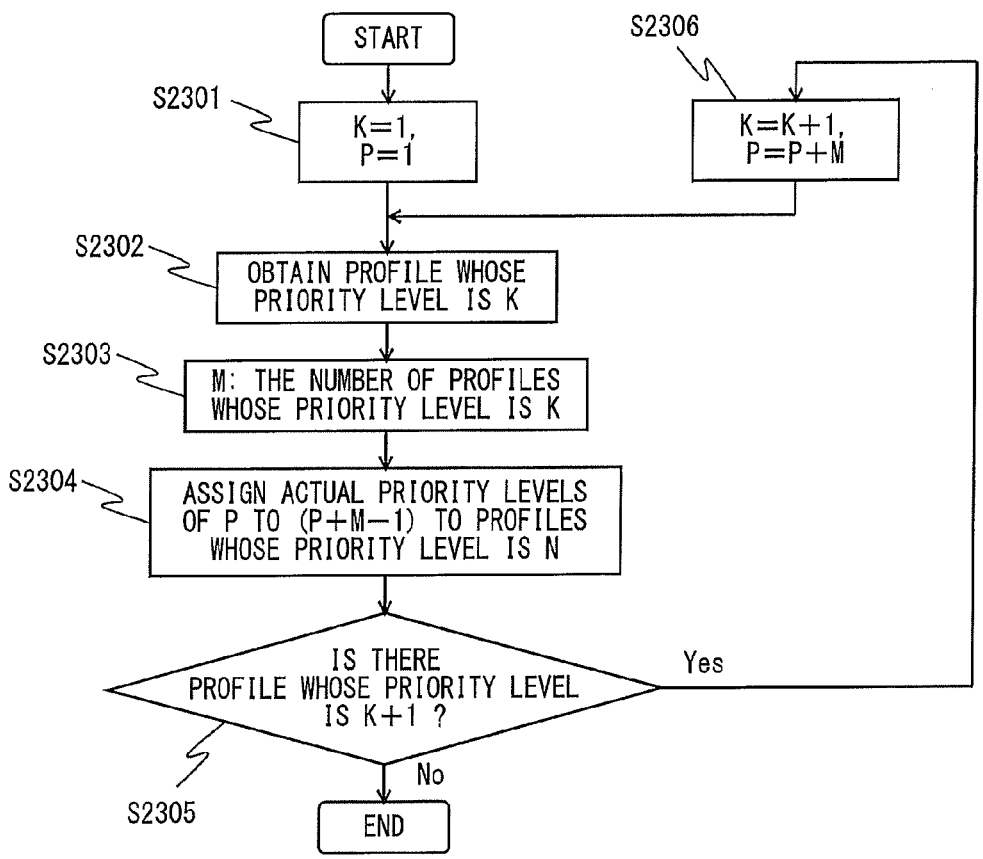
FIG. 23 is a flowchart showing a process of creating the at-network-switching profile list 2100 according to the fifth embodiment.

Subsequently, the process performed by the at-network-switching profile temporarily-creating storing section 1814 to create the at-network-switching profile list 2100 will be described with reference to the flowchart shown in FIG. 23. All of the following steps are carried out by the at-network-switching profile temporarily-creating storing section 1814.

S2301: In order to obtain profiles in the profile list 1900 managed by the profile management section 1803, a variable K for determining the automatic connection priority level 1903 is set to 1, and a variable P for determining the automatic connection actual priority level 2103 in the at-network-switching profile list 2100 is set to 1.

S2302: All profiles of which the automatic connection priority level 1903 is K are obtained from the profile list 1900.

S2303: The number of the obtained profiles is defined as M.

S2304: The cumulative number of times of connection 2002 in the connection frequency information 2000 managed by the connection candidate determination auxiliary information management section 1813 is obtained for each of the obtained profiles. Integer values sequentially increasing from P are assigned as the automatic connection actual priority levels 2103 to the profiles in descending order of the cumulative number of times of connection 2002, to form the at-network-switching profile list 2100. At this time, the profile name 1901, the network type 1904, the network device identification information 1905, the network identification information 1906, and the authentication/encryption information 1907 in the profile list 1900 are the same as those registered in the profile list 1900. Here, when there are profiles for which the cumulative number of times of connection 2002 is the same, a smaller value is assigned as the automatic connection actual priority level 2103 to a profile that has been registered in the profile list 1900 earlier than the others (a profile that appears at the upper part in FIG. 19).

S2305: The presence or absence of a profile of which the automatic connection priority level 1903 is "K+1" is confirmed by referring to the profile list 1900 managed by the profile management section 1803. When the profile of which the automatic connection priority level 1903 is "K+1" is proved to be absent as a result of the confirmation, the process ends without any change. When the profile of which the automatic connection priority level 1903 is "K+1" is present, the process proceeds to step S2306.

S2306: K is set to K+1, P is set to P+M, and then the process proceeds to step S2302.

As described above, according to the present embodiment, when there are profiles for which the automatic connection priority levels are equal in the profile list managed by the profile management section 1803, a profile that has a larger cumulative number of times of connection, managed by the connection candidate determination auxiliary information management section 1813, and indicating the cumulative number of times of connection to a network designated by the profile, is preferentially used for connection. Therefore, automatic connection to a frequently-used network can be performed more preferentially, and thus the usability of networks can be enhanced.

In the present embodiment, the connection information determination auxiliary information management section is configured to store the cumulative number of times of connection to networks in association with each of the profiles used for connection to the networks, and the automatic connection control section is configured to place priority on connection to a network for which the cumulative number of times of connection is large. However, for example, the connection candidate determination auxiliary information management section may be configured to store the success rate of connection instead of the cumulative number of times of connection, and the automatic connection control section may be configured to place priority on connection to a network for which the success rate of connection is high. In this case, the success rate of connection can be increased. In addition, if the connection candidate determination auxiliary information management section is configured to store communication speeds of the networks instead of the cumulative number of times of connection and the automatic connection control section is configured to place priority on connection to a network having a high communication speed, the expected value of the communication speeds of the networks selected by the automatic connection control section can be increased. Furthermore, if the connection candidate determination auxiliary information management section is configured to store communication cost information instead of the cumulative number of times of connection and the automatic connection control section is configured to place priority on connection to a network for which the communication cost is low, the expected value of the communication cost can be reduced. Furthermore, the information stored by the connection candidate determination auxiliary information management section may be scores calculated by using an optional combination of the communication speed, the communication cost, the success rate of connection, and the number of times of connection, and the priority levels for connection may be determined based on the scores.

Sixth Embodiment

FIG. 24 is a diagram illustrating an environment in which a network connection device 2400 according to a sixth embodiment operates.

In FIG. 24, the environment in which the network connection device 2400 operates includes one or more networks 101, and the networks 101 are networks which are similar to those in the first embodiment and to which the network connection device 2400 can connect.

Figure 25:
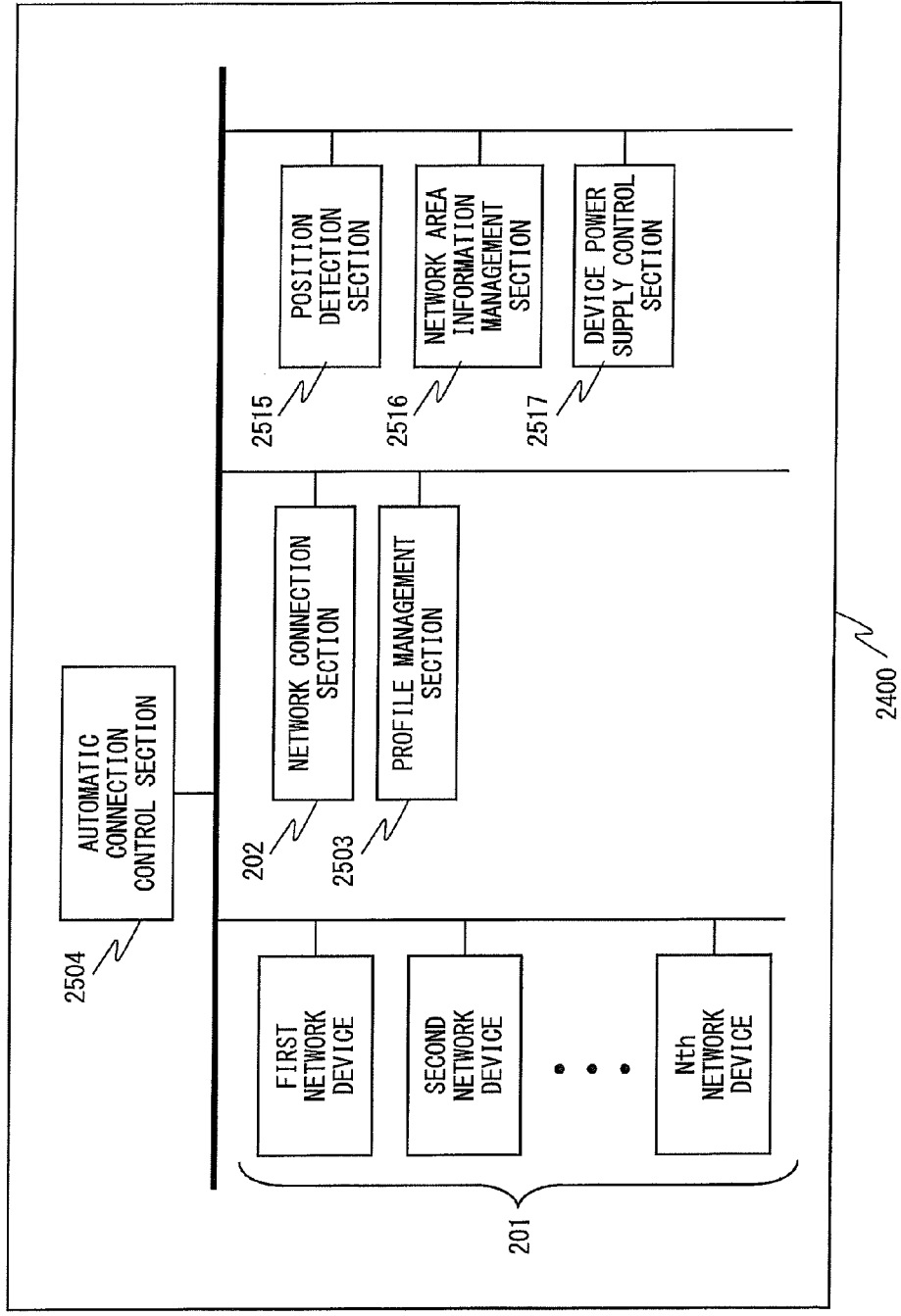
FIG. 25 is a block diagram showing a configuration of the network connection device 2400 according to the sixth embodiment.

Next, the overall configuration of the network connection device 2400 will be described with reference to FIG. 25. In FIG. 25, the network connection device 2400 includes network devices 201, a network connection section 202, a profile management section 2503, an automatic connection control section 2504, a position detection section 2515, a network area information management section 2516, and a device power supply control section 2517.

Among these components, substantially the same components as those described in the first embodiment will not be repeatedly described.

The profile management section 2503 manages profiles that contain various information needed when connection to the networks 101 is made and other additional information, and also manages a profile list 2600 described later with reference to FIG. 26. The various information of the profiles are set by a user.

The automatic connection control section 2504 selects one profile that contains information needed for connection to a candidate network to which connection is next made, from among the profiles managed by the profile management section 2503, in accordance with automatic connection priority levels described later, and also instructs the device power supply control section 2517 described later to turn on or off a power supply of a predetermined network device of the network devices 201.

The position detection section 2515 is composed of a GPS (Global Positioning System) device, and obtains the position of the network connection device 2400 as data indicating latitude and longitude every predetermined period.

When an area in which a profile managed by the profile management section 2503 is usable can be specified, the network area information management section 2516 stores a position of the area as data indicating latitude and longitude. Specifically, for a profile used for connection to a WLAN network, the position of an access point for the WLAN is stored as data indicating latitude and longitude. No positional information is stored for profiles used for connection to networks other than the WLAN network.

The device power supply control section 2517 turns on or off a power supply of a predetermined network device of the network devices 201, in accordance with designation by the automatic connection control section 2504.

FIG. 26 is a diagram showing an example of the profile list 2600. In FIG. 26, each of the profiles listed in the profile list 2600 includes a profile name 2601, an automatic connection priority level 2603, a network type 2604, network device identification information 2605, network identification information 2606, and authentication/encryption information 2607. Hereinafter, each of the components will be described. The profile name 2601 indicates the name of a profile.

The automatic connection priority level 2603 is information indicating a priority level of a profile for use in network connection. The automatic connection control section 2504 uses the profiles in descending order of the priority levels at the time of network connection. In the example of FIG. 26, the automatic connection priority level 2603 is set as an integer value starting from "1", and "1" corresponds to the highest priority level. The larger the integer value is, the lower the priority level is.

The network type 2604 is information indicating the type of a network 101 to which connection is made by using the profile. The network device identification information 2605 is information for specifying a network device 201 used when network connection is made by using the profile. The network identification information 2606 is information for specifying a network 101 to which connection is made by using the profile. The authentication/encryption information 2607 is information about authentication/encryption needed when connection to a network 101 is made by using the profile.

In FIG. 26, the profile list 2600 lists four profiles whose profile names 2601 are "profile A", "profile B", "profile C", and "profile D", respectively. The priority levels of "profile A", "profile B", "profile C", and "profile D" for use in connection are 1, 2, 3, and 4, respectively. For example, the type of a network 101 to which connection is made by using "profile A" is "WLAN". The profile list 2600 indicates that a network device 201 used when network connection is made by using "profile A" is a "first network device", the network 101 to which connection is made by using "profile A" is a "first network", an authentication method used when connection to the network 101 is made by using "profile A" is "A", an encryption method is "AA", and information for authentication such as a network key is "AAA".

FIG. 27 is a diagram showing an example of network area information 2700 managed by the network information management section 2516.

The network area information 2700 is a table composed of records corresponding to the profiles contained in the profile list managed by the profile management section 2503. In FIG. 27, the reference numeral 2701 denotes profile names of the profiles contained in the profile list managed by the profile management section 2503. The reference numeral 2702 denotes area information corresponding to each of the profiles contained in the profile list managed by the profile management section 2503. In the case where, for example, the network type 2604 of a profile that has the corresponding profile name is WLAN, the position at which an access point for the WLAN is located is stored as the area information including latitude and longitude. In the example shown in FIG. 27, the network area information 2700 indicates that the positions of access points for the WLAN are at (34.743759 degrees north latitude, 135.570431 degrees east longitude), (35.681382 degrees north latitude, 139.766084 degrees east longitude), and (34.686299 degrees north latitude, 135.529146 degrees east longitude) for three profiles whose profile names 2701 are "profile A", "profile B", and "profile C", respectively.

Figure 28:
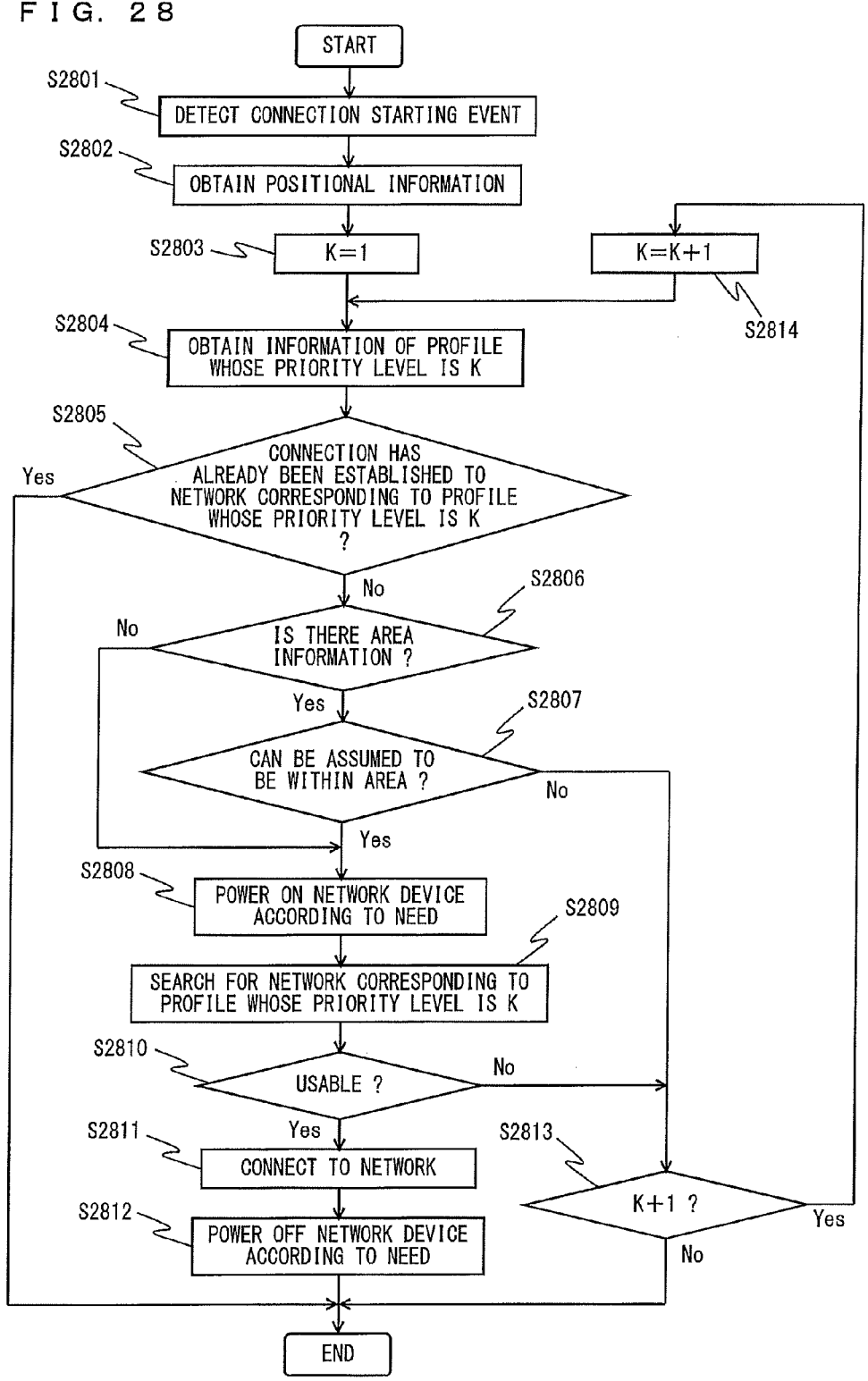
FIG. 28 is a flowchart showing the operation of the network connection device 2400 according to the sixth embodiment.

Next, the operation of the network connection device 2400 according to the present embodiment will be described with reference to the flowchart in FIG. 28.

S2801: The automatic connection control section 2504 detects an event acting as a trigger for starting a process for connection to a network 101 from step S2802. The event is generated at a similar time to when an event is generated at step S501 described in the first embodiment.

S2802: The automatic connection control section 2504 instructs the position detection section 2515 to detect the position of the network connection device 2400. The position detection section 2515 obtains positional information (defined as a position PS6) of the network connection device 2400.

S2803: The automatic connection control section 2504 sets K to 1 (K is an integer to be incremented within a range of 1≤K≤N, and N is the number of profiles) in order to perform step S2804 and the subsequent steps for a profile of which the automatic connection actual priority level 2603 is "1", and then proceeds to step S2804.

S2804: The automatic connection control section 2504 refers to the profile list 2600 managed by the profile management section 2503, and obtains information of a profile (defined as a profile P6-K (1≤K≤N)) of which the automatic connection priority level 2603 is "K".

S2805: The automatic connection control section 2504 transfers the information of the profile P6-K to the network connection section 202, and inquires of the network connection section 202 whether or not connection to a network 101 (defined as a network NW6-K) has already been established by using the profile P6-K. The network connection section 202 determines whether or not connection to the network NW6-K has already been established, by using a network device 201 (defined as a network device ND6-K) specified by the network device identification information 2605 contained in the received profile. The network connection section 202 notifies the automatic connection control section 2504 of the determination result. When the determination result is "already connected", the automatic connection control section 2504 determines that connection to the network 101 has been established in accordance with the priority levels, and then ends the process without any change. When the determination result is "unconnected", the automatic connection control section 2504 proceeds to step S2806.

S2806: The automatic connection control section 2504 checks whether area information 2702 corresponding to the profile P6-K is present or absent in the network area information 2700 managed by the network area information management section 2516. When the area information is present, the process proceeds to step S2807, and when the area information is absent, the process proceeds to step S2808.

S2807: The automatic connection control section 2504 determines whether or not the network connection device 2400 can be assumed to be within an area, by using the position PS6 detected by the position detection section 2515 at step S2803 and the area information 2702 corresponding to the profile P6-K. Specifically, if the position PS6 is within a range of ±0.000300 degrees (equivalent to about ±33 meters when converted to a distance on the Earth) from each of the latitude and longitude indicated by the area information 2702, the automatic connection control section 2504 determines that the network connection device 2400 can be assumed to be within the area. When the network connection device 2400 can be assumed to be within the area, the process proceeds to step S2808, and when the network connection device 2400 cannot be assumed to be within the area, the process proceeds to step S2812. In the present embodiment, positions within a range of ±0.000300 degrees are assumed to be within the area based on a distance at which a general WLAN terminal can connect to the WLAN access point.

S2808: The automatic connection control section 2504 transfers the information of the profile P6-K to the device power supply control section 2517. When a power supply of a network device 201 for connecting to a network using the profile P6-K is not turned on, the automatic connection control section 2504 instructs the device power supply control section 2517 to turn on the power supply. Based on the network device identification information 2605 of the profile P6-K, the device power supply control section 2517 checks the state of the power supply of the corresponding one of the network devices 201. If the power supply is off, the device power supply control section 2517 turns on the power supply.

S2809: The automatic connection control section 2504 transfers the information of the profile P6-K to the network connection section 202, and requests the network connection section 202 to search for a network 101 to which connection is made by using the profile P6-K. The network connection section 202 search for the network NW6-K by using the network device ND6n, and determines whether or not the network NW6-K is usable.

S2810: When the result of the determination by the network connection section 202 is "usable", the process proceeds to step S2811, and when the result is "unusable", the process proceeds to step S2812.

S2811: The network connection section 202 connects to the network NW6-K by using the network device ND6-K, and then the process ends. The network connection section 202 uses the contents described in the authentication/encryption information 2607 contained in the profile P6-K as authentication/encryption-related information needed for the connection. When the cell of the authentication/encryption information 2607 is blank or when additional information is needed, an inquiry is made to the user to obtain information. In addition, when connection to a network 101 other than the network NW6-K has already been established, the network connection section 202 disconnects from the other network 101.

S2812: When a network is disconnected at step S2811, the automatic connection control section 2504 instructs the device power supply control section 2517 to turn off a power supply of a network device corresponding to the disconnected network.

S2813: The automatic connection control section 2504 refers to the profile list 2600 managed by the profile management section 2503, and confirms the presence or absence of a profile of which the automatic connection priority level 2603 is "K+1". When the profile of which the automatic connection priority level 2603 is "K+1" is proved to be absent as a result of the confirmation, the process ends without any change. When the profile of which the automatic connection priority level 2603 is "K+1" is absent, the process proceeds to step S2814.

S2814: The automatic connection control section 2504 sets K to K+1, and then the process proceeds to step S2804.

As described above, according to the present embodiment, the position detection section 2515 detects the position of the network connection device 2400, and the network area information management section 2516 stores area information relating to some profiles in the profile list managed by the profile management section 2503 and indicating areas that are assumed to allow connection to be made by using the profiles. Therefore, when the automatic connection control section 2504 selects a profile to be used, profiles for which the network connection device 2400 is assumed to be out of the areas can be previously eliminated from the choices. This can speed up the selection of a profile to be used.

Furthermore, when there is area information relating to a profile, a power supply of a network device is turned on or off by the device power supply control section 2517 depending on the position of the network connection device 2400. Therefore, power supplies of the network devices 201 can be turned on only when necessary, and thus power saving in the network connection device 2400 can be achieved.

In the present embodiment, an example in which information based on the position at which a WLAN access point is located is used as the network area information has been described. However, as described below, various network area information, additional components, and effects can be realized.

(1) If service area information about a service provider of WWAN or WiMAX is used as the network area information, power saving can be achieved by powering on a usable WWAN device or WiMAX device only when necessary.

(2) If service area information about a plurality of service providers of WWAN is used as the network area information and means for storing information associating the service providers with communication costs is added, connection can be made to the most inexpensive WWAN network among usable WWAN networks, and thus reduction in communication cost can be achieved.

(3) In the case where a WLAN/WiMAX combo device that can power on only one of a network device corresponding to WLAN and a network device corresponding to WiMAX is used, if network area information about WLAN is used as the network area information, whether or not WLAN for which the corresponding network device is powered off is connectable can be estimated while connection to WiMAX is established. On the other hand, if service area information about a service provider of WiMAX is used as the network area information, whether or not WiMAX for which the corresponding network device is powered off is connectable can be estimated while connection to WLAN is established. Thus, network switching can be performed more flexibly.

(4) If means for storing information associating networks with communication speeds is added, connection to the fastest network can be made, and thus communication can be speeded up.

Seventh Embodiment

Figure 29:
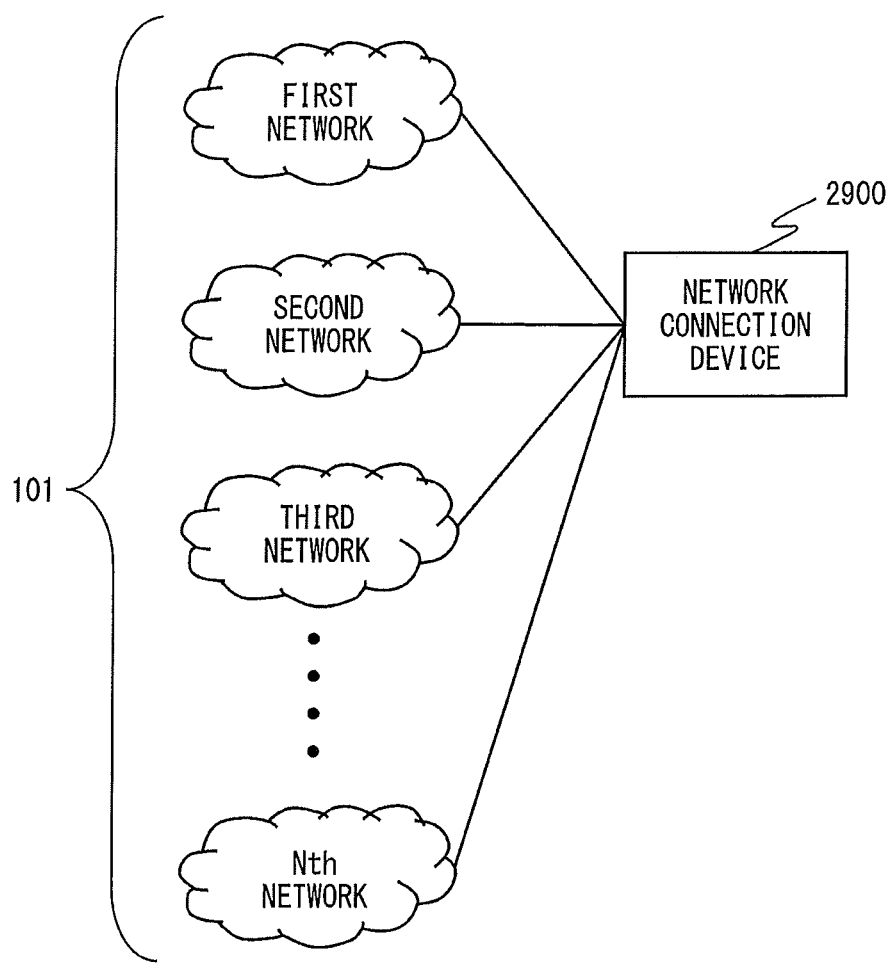
FIG. 29 is a diagram illustrating an environment in which a network connection device 2900 according to the seventh embodiment operates.

FIG. 29 is a diagram illustrating an environment in which a network connection device 2900 operates.

In FIG. 29, the environment in which the network connection device 2900 operates includes one or more networks 101, and the networks 101 are networks which are similar to those in the first embodiment and to which the network connection device 2900 can connect.

Figure 30:
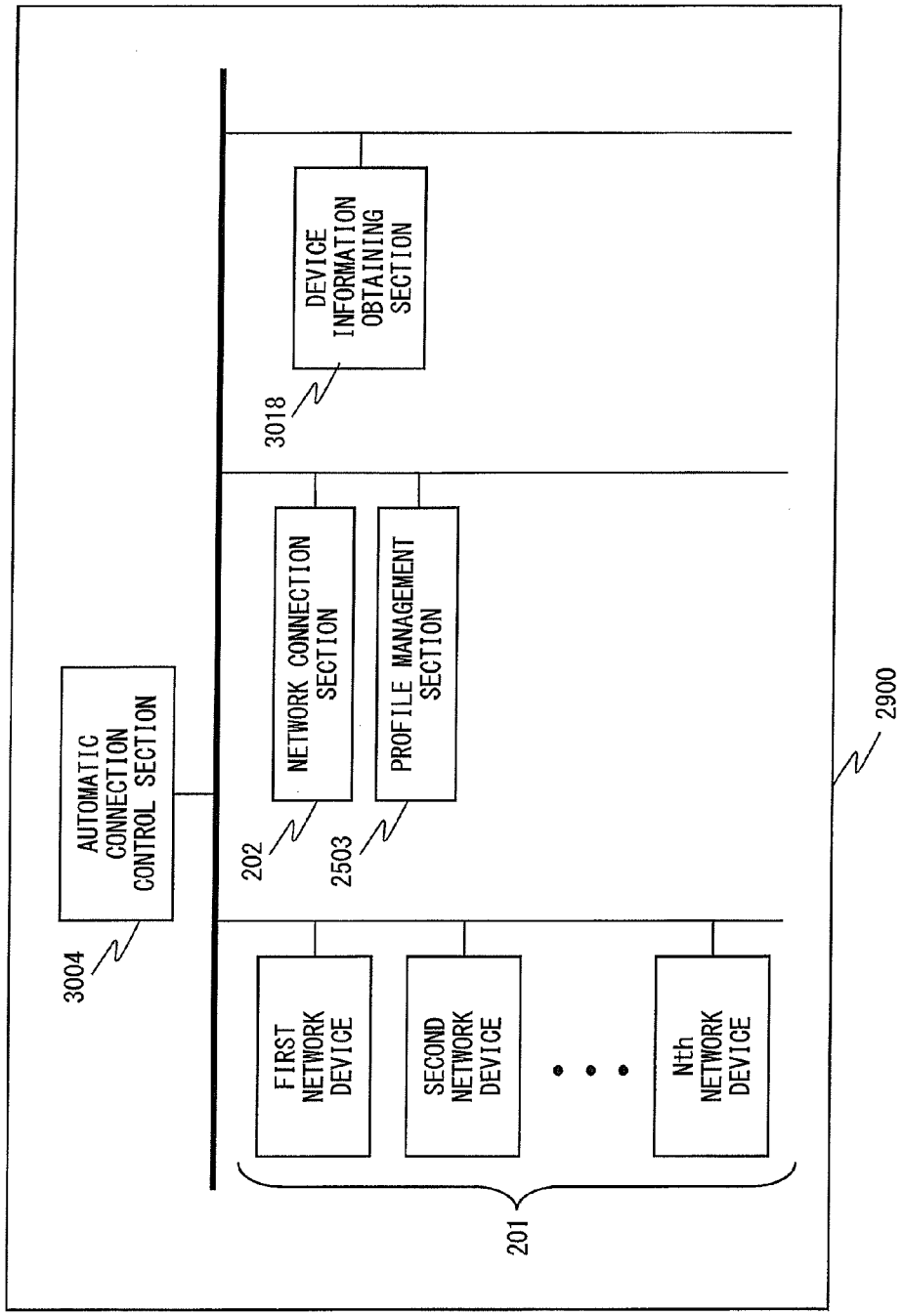
FIG. 30 is a block diagram showing a configuration of the network connection device 2900 according to the seventh embodiment.

Next, the overall configuration of the network connection device 2900 will be described with reference to FIG. 30. In FIG. 30, the network connection device 2900 includes network devices 201, a network connection section 202, a profile management section 2503, an automatic connection control section 3004, and a device information obtaining section 3018.

Among these components, substantially the same components as those described in the first and sixth embodiments will not be repeatedly described.

Power supplies of the network devices 201 can be turned on or off for each network device by using means which is not shown.

The profile management section 2503 manages profiles that contain various information needed when connection to the networks 101 is made and other additional information, and also manages the profile list 2600 described in the fifth embodiment with reference to FIG. 26. In the present embodiment, the various information of the profiles are set by a user.

The automatic connection control section 3004 selects one profile that contains information needed for connection to a candidate network to which connection is next made, from among the profiles managed by the profile management section 2503, in accordance with automatic connection priority levels which will be described later and device information obtained by the device information obtaining section 3018 which will also be described later.

The device information obtaining section 3018 obtains information as to whether the power supply of a predetermined network device of the network devices 201 is on or off, in accordance with an instruction from the automatic connection control section 3004.

Next, the operation of the network connection device 2900 according to the present embodiment will be described with reference to the flowchart in FIG. 31.

S3101: The automatic connection control section 3004 detects an event acting as a trigger for staring a process for connection to a network 101 from step S3102. The event is generated at a similar time to when an event is generated at step S501 described in the first embodiment.

S3102: The automatic connection control section 3004 sets K to 1 (K is an integer to be incremented within a range of 1≤K≤N, and N is the number of profiles) in order to perform step S3103 and the subsequent steps for a profile of which the automatic connection priority level 2603 in the profile list 2600 is "1", and then proceeds to step S3103.

S3103: The automatic connection control section 3004 refers to the profile list 2600 managed by the profile management section 2503, and obtains information of a profile (defined as a profile P7-K) of which the automatic connection priority level 2603 is "K".

S3104: The automatic connection control section 3004 transfers the information of the profile P7-K to the device information obtaining section 3018, and inquires of the device information obtaining section 3018 whether the power supply of a network device 201 used for network connection made by means of the profile P7-K is on or off. The device information obtaining section 3018 determines whether the power supply of a network device 201 (defined as a network device ND7-K) specified by the network device identification information 2605 contained in the profile P7-K is on or off, and notifies the automatic connection control section 3004 of the determination result. When the power supply of the network device ND7-K is on, the process proceeds to step S3105, and when the power supply is off, the process proceeds to step S3110.

S3105: The automatic connection control section 3004 transfers the information of the profile P7-K to the network connection section 202, and inquires of the network connection section 202 whether or not connection to a network 101 (defined as a network NW7-K) has already been established by using the profile P7-K. The network connection section 202 determines whether or not connection to the network NW7-K has already been established, by using the network device 201 (network device ND7-K) specified by the network device identification information 2605 contained in the profile P7-K. The network connection section 202 notifies the automatic connection control section 3004 of the determination result. When the determination result is "already connected", the automatic connection control section 3004 determines that connection to the network 101 has been established in accordance with the priority levels, and then ends the process without any change. When the determination result is "unconnected", the automatic connection control section 3004 proceeds to step S3106.

S3106: The automatic connection control section 3004 transfers the information of the profile P7-K to the network connection section 202, and requests the network connection section 202 to search for the network 101 to which connection is made by using the profile P7-K. The network connection section 202 searches for the network NW7-K by using the network device ND7-K, and determines whether or not the network NW7-K is usable.

S3107: When the result of the determination by the network connection section 202 is "usable", the process proceeds to step S3108, and when the result is "unusable", the process proceeds to step S3109.

S3108: The network connection section 202 connects to the network NW7-K by using the network device ND7-K, and then the process ends. The network connection section 202 uses the contents described in the authentication/encryption information 2607 contained in the profile P7-K as authentication/encryption-related information needed for the connection. When the cell of the authentication/encryption information 2607 is blank or when additional information is needed, an inquiry is made to the user to obtain information. When connection to a network 101 other than the network NW7-K has already been established, the network connection section 202 disconnects from the other network 101.

S3109: The automatic connection control section 3004 refers to the profile list 2600 managed by the profile management section 2503, and confirms the presence or absence of a profile of which the automatic connection actual priority level 2603 is "K+1". When the profile of which the automatic connection actual priority level 2603 is "K+1" is proved to be absent as a result of the confirmation, the process ends without any change. When the profile of which the automatic connection actual priority level 2603 is "K+1" is present, the process proceeds to step S3110.

S3110: The automatic connection control section 3004 sets K to K+1, and then the process proceeds to step S3104.

As described above, according to the present embodiment, in the process where a profile is automatically selected by the automatic connection control section 3004 in accordance with the automatic connection priority levels in the profile list managed by the profile management section 2503, and then connection to a network is made, if information obtained by the device information obtaining section 3018 indicates that the power supply of a network device 201 corresponding to the network is off, some steps such as the step of searching for the network are not performed, and a network corresponding to a profile having the next highest priority level is used. Accordingly, selection of a profile to be used in automatic connection can be speeded up.

In the present embodiment, the device information obtaining section is configured to obtain information about the state of the power supply of a network device. However, information obtained by the device information obtaining section is not limited to information about the state of a power supply, and may be any type of information as long as it relates to the state of a network device. For example, information about a subscriber of a network device may be obtained, and more specifically, information of an SIM (Subscriber Identity Module) card may be obtained. In this case, if the SIM card is in a locked state, that is, the SIM card cannot be used unless the lock is released, the network device can be treated as being powered off, similarly as in the present embodiment. In addition, if information about a provider of a connectable WWAN is recorded on the SIM card, network connection can be speeded up by attempting connection only when the WWAN provider matches the network identification information contained in the profile information.

The first to seventh embodiments have been descried above as examples of the technology disclosed in the present application. However, the technology according to the present disclosure is not limited to these embodiments, and is also applicable to other embodiments realized by appropriate modification, replacement, addition, or omission. Furthermore, another embodiment can be realized by combining the components described in the first to seventh embodiments.

The above embodiments have been described as examples of the technology according to the present disclosure. For this purpose, the accompanying drawings and the detailed descriptions are provided. Thus, in order to exemplify the technology, the components shown in the accompanying drawings and mentioned in the detailed descriptions include not only components essential to solution of the problems but also components inessential to solution of the problems. Therefore, such inessential components should not be readily construed as being essential based on the fact that such inessential components are shown in the accompanying drawings or mentioned in the detailed descriptions. Furthermore, the above embodiments have been described to exemplify the technology according to the present disclosure, and therefore, various modification, replacement, addition, and omission can be made within the scope defined by the claims or its equivalent scope.

The network connection device and method according to the present disclosure are useful for terminals connectable to networks. Specifically, the network connection device and method according to the present disclosure are applicable to mobile routers, personal computers, and the like.

What is claimed is:

1. A network connection method executed by a computer equipped with a microprocessor and one or more network devices configured to connect to a plurality of networks which are connection destinations, in order to switch a connection destination between the plurality of networks and connect to any one of the plurality of networks, the network connection method comprising:

a network switching control step of determining, in accordance with a predetermined condition, a second network as a candidate network to which connection is subsequently switched from a first network to which the computer is currently connecting by using the network device;

a network relation state determination step of determining whether or not the network device used for connecting to the first network is used for forming a PAN (Personal Area Network);

a disconnection-caused disadvantage determination step of determining that switching to the second network is unacceptable when the PAN formed by the network device is extinguished or communication quality of the PAN is deteriorated by switching connection to the second network, based on the result of the determination at the network relation state determination step; and a switching acceptability determination step of prohibiting switching connection to the second network and maintaining connection to the first network when the result of the determination at the disconnection-caused disadvantage determination step is that the switching to the second network is unacceptable.

2. The network connection method according to claim 1, wherein when communication quality of the PAN is deteriorated by switching connection to the second network, the disconnection-caused disadvantage determination step determines that switching to the second network is unacceptable.

3. The network connection method according to claim 1, wherein the PAN is a network in which the computer functions as an access point for another terminal.

4. A non-transient computer-readable storage medium having stored thereon a program executed by a computer equipped with a microprocessor and one or more network devices configured to connect to a plurality of networks which are connection destinations, in order to switch a connection destination between the plurality of networks and connect to any one of the plurality of networks, the program comprising:

a network switching control step of determining, in accordance with a predetermined condition, a second network as a candidate network to which connection is subsequently switched from a first network to which the computer is currently connecting by using a network device;

a network relation state determination step of determining whether or not the network device used for connecting to the first network is used for forming a PAN (Personal Area Network);

a disconnection-caused disadvantage determination step of determining that switching to the second network is unacceptable when the PAN formed by the network device is extinguished or communication quality of the PAN is deteriorated by switching connection to the second network, based on the result of the determination at the network relation state determination step; and a switching acceptability determination step of prohibiting switching connection to the second network and maintaining connection to the first network when the result of the determination at the disconnection-caused disadvantage determination step is that the switching to the second network is unacceptable.

5. The network connection method according to claim 1, wherein when the PAN formed by the network device is extinguished by switching connection to the second network, the disconnection-caused disadvantage determination step determines that switching to the second network is unacceptable.

6. The network connection method according to claim 5, wherein when the network device used for connecting to the first network is also used for forming the PAN, and the PAN is extinguished by switching connection to the second network, the disconnection-caused disadvantage determination step determines that the switching to the second network is unacceptable.

7. The network connection method according to claim 5, wherein the network device used for connecting to the first network has a function of connecting to the plurality of networks via a plurality of different communication standards, and when the PAN is formed in accordance with a specific communication standard, connection to the first network is made via the specific communication standard, connection to the second network is made via a communication standard different from the specific communication standard, and the PAN is extinguished by switching connection to the second network, the disconnection-caused disadvantage determination step determines that the switching to the second network is unacceptable.

8. The network connection method according to claim 5, wherein the computer further includes a connection mode control section configured to control switching between a manual connection mode for receiving an instruction from the user and performing connection and disconnection to and from the plurality of networks in accordance with the instruction, and an automatic connection mode for performing connection and disconnection to and from the plurality of networks in accordance with a predetermined rule, wherein the connection mode control section performs switching to the automatic connection mode only when no connection to the PAN has been established or when preparation for connecting to the PAN has not been completed.

9. The non-transient computer-readable storage medium according to claim 4, wherein when the PAN formed by the network device is extinguished by switching connection to the second network, the disconnection-caused disadvantage determination step determines that switching to the second network is unacceptable.

10. The non-transient computer-readable storage medium according to claim 9, wherein when the network device used for connecting to the first network is also used for forming the PAN, and the PAN is extinguished by switching connection to the second network, the disconnection-caused disadvantage determination step determines that the switching to the second network is unacceptable.

11. The non-transient computer-readable storage medium according to claim 9, wherein the network device used for connecting to the first network has a function of connecting to the plurality of networks via a plurality of different communication standards, and when the PAN is formed in accordance with a specific communication standard, connection to the first network is made via the specific communication standard, connection to the second network is made via a communication standard different from the specific communication standard, and the PAN is extinguished by switching connection to the second network, the disconnection-caused disadvantage determination step determines that the switching to the second network is unacceptable.

12. The non-transient computer-readable storage medium according to claim 9, wherein the computer further includes a connection mode control section configured to control switching between a manual connection mode for receiving an instruction from the user and performing connection and disconnection to and from the plurality of networks in accordance with the instruction, and an automatic connection mode for performing connection and disconnection to and from the plurality of networks in accordance with a predetermined rule, wherein the connection mode control section performs switching to the automatic connection mode only when no connection to the PAN has been established or when preparation for connecting to the PAN has not been completed.

13. The non-transient computer-readable storage medium according to claim 4, wherein when communication quality of the PAN is deteriorated by switching connection to the second network, the disconnection-caused disadvantage determination step determines that switching to the second network is unacceptable.

14. The non-transient computer-readable storage medium according to claim 4, wherein the PAN is a network in which the computer functions as an access point for another terminal.

15. A computer comprising:
a microprocessor;
a memory having a program stored therein; and
a network device, wherein
the program is executed by the microprocessor to perform an operation including:
a network switching control step of determining, in accordance with a predetermined condition, a second network as a candidate network to which connection is subsequently switched from a first network to which the computer is currently connecting by using the network device;
a network relation state determination step of determining whether or not the network device used for connecting to the first network is used for forming a PAN (Personal Area Network);
a disconnection-caused disadvantage determination step of determining that switching to the second network is unacceptable when the PAN formed by the network device is extinguished or communication quality of the PAN is deteriorated by switching connection to the second network, based on the result of the determination at the network relation state determination step; and
a switching acceptability determination step of prohibiting switching connection to the second network and maintaining connection to the first network when the result of the determination at the disconnection-caused disadvantage determination step is that the switching to the second network is unacceptable.

16. The computer according to claim 15, wherein when the PAN formed by the network device is extinguished by switching connection to the second network, the disconnection-caused disadvantage determination step determines that switching to the second network is unacceptable.

17. The computer according to claim 16, wherein when the network device used for connecting to the first network is also used for forming the PAN, and the PAN is extinguished by switching connection to the second network, the disconnection-caused disadvantage determination step determines that the switching to the second network is unacceptable.

18. The computer according to claim 16, wherein the network device used for connecting to the first network has a function of connecting to the plurality of networks via a plurality of different communication standards, and when the PAN is formed in accordance with a specific communication standard, connection to the first network is made via the specific communication standard, connection to the second network is made via a communication standard different from the specific communication standard, and the PAN is extinguished by switching connection to the second network, the disconnection-caused disadvantage determination step determines that the switching to the second network is unacceptable.

19. The computer according to claim 16, wherein the computer further includes a connection mode control section configured to control switching between a manual connection mode for receiving an instruction from the user and performing connection and disconnection to and from the plurality of networks in accordance with the instruction, and an automatic connection mode for performing connection and disconnection to and from the plurality of networks in accordance with a predetermined rule, wherein the connection mode control section performs switching to the automatic connection mode only when no connection to the PAN has been established or when preparation for connecting to the PAN has not been completed.

20. The computer according to claim 15, wherein when communication quality of the PAN is deteriorated by switching connection to the second network, the disconnection-caused disadvantage determination step determines that switching to the second network is unacceptable.

21. The computer according to claim 15, wherein the PAN is a network in which the computer functions as an access point for another terminal.

* * * * *